(12) United States Patent
Ashizawa et al.

(10) Patent No.: US 12,472,199 B2
(45) Date of Patent: Nov. 18, 2025

(54) P-ETHOXY NUCLEIC ACIDS FOR IGF-1R INHIBITION

(71) Applicants: Bio-Path Holdings, Inc., Bellaire, TX (US); Thomas Jefferson University, Philadelphia, PA (US)

(72) Inventors: Ana Ashizawa, Bellaire, TX (US); Douglas Craig Hooper, Medford, NJ (US); David W. Andrews, Philadelphia, PA (US)

(73) Assignee: THOMAS JEFFERSON UNIVERSITY, Philadelphia, PA (US)

( * ) Notice: Subject to any disclaimer, the term of this patent is extended or adjusted under 35 U.S.C. 154(b) by 244 days.

(21) Appl. No.: 17/530,051

(22) Filed: Nov. 18, 2021

(65) Prior Publication Data

US 2022/0133775 A1    May 5, 2022

Related U.S. Application Data

(63) Continuation of application No. 16/606,377, filed as application No. PCT/US2018/028308 on Apr. 19, 2018, now abandoned.

(60) Provisional application No. 62/487,425, filed on Apr. 19, 2017.

(51) Int. Cl.
| | |
|---|---|
| *A61K 31/7125* | (2006.01) |
| *A61K 47/69* | (2017.01) |
| *A61P 35/00* | (2006.01) |
| *C12N 15/11* | (2006.01) |
| *C12N 15/113* | (2010.01) |
| *A61K 9/00* | (2006.01) |
| *A61K 45/06* | (2006.01) |

(52) U.S. Cl.
CPC ...... *A61K 31/7125* (2013.01); *A61K 47/6911* (2017.08); *A61P 35/00* (2018.01); *C12N 15/111* (2013.01); *C12N 15/113* (2013.01); *C12N 15/1138* (2013.01); *A61K 9/0019* (2013.01); *A61K 45/06* (2013.01)

(58) Field of Classification Search
CPC ............ A61K 31/7125; A61K 47/6911; A61K 45/06; A61P 35/00; C12N 15/111; C12N 15/113; C12N 15/1138
See application file for complete search history.

(56) References Cited

U.S. PATENT DOCUMENTS

| | | | |
|---|---|---|---|
| 6,015,886 | A | 1/2000 | Dale et al. |
| 6,340,674 | B1 | 1/2002 | Baserga et al. |
| 9,744,187 | B2 | 8/2017 | Nielsen |
| 2003/0180789 | A1 | 9/2003 | Dale |
| 2005/0080246 | A1 | 4/2005 | Allerson et al. |
| 2017/0056430 | A1 | 3/2017 | Andrews et al. |
| 2017/0202157 | A1 | 7/2017 | Onac et al. |

FOREIGN PATENT DOCUMENTS

| | | |
|---|---|---|
| WO | 2001060998 | 8/2003 |
| WO | 2003070911 | 8/2003 |
| WO | 2017066643 | 4/2017 |

OTHER PUBLICATIONS

Notice of Final Rejection dated Dec. 22, 2023 issue in Korean Patent Application No. 10-2019-7034170.
Search Report dated Dec. 21, 2020 issued in European Patent Application No. 18788289.9.
Office Action dated Sep. 2, 2021 issued in Chinese Patent Application No. 201880036079.X.
Office Action dated Apr. 19, 2022 issued in Japanese Patent Application No. 2019-556913.
Gutierrez-Puente, et al. "Safety, Pharmacokinetics, and Tissue Distribution of Liposomal P-Ehtoxy Antisense Oligonucleotides Tafed to Bcl-2," Journal of Pharmacology and Experimental Therapeutics, Nov. 1, 1999, vol. 291, No. 2, pp. 865-869.
Sathornsumetee, et al. "Designer Therapies for Glioblastoma Multiforme," Annals of the New York Academy of Sciences, Oct. 1, 2008, vol. 1142, No. 1, pp. 108-132.
International Search Report and Written Opinion of the International Searching Authority United States in International Application No. PCT/US2018/028308, mailed Jul. 20, 2018.
Office Action dated Jul. 4, 2023 issued in Australian Patent Application No. 2018254485.
Gutiérrez-Puente et al: "Cellular Pharmacology of P-ethoxy Antisense Oligonucleotides Targeted to Bcl-2 in a Follicular Lymphoma Cell Line", Leukemia and Lymphoma., vol. 44, No. 11, Jan. 1, 2003 (Jan. 1, 2003), US, pp. 1979-1985, XP055333566, ISSN: 1042-8194, DOI: 10.1080/1042819031000099733.
Office Action dated Jun. 12, 2023 issued in Mexican Patent Application No. MX/a/2019/012493.

*Primary Examiner* — J. E. Angell
(74) *Attorney, Agent, or Firm* — Cozen O'Connor

(57) ABSTRACT

Provided herein are methods of treating cancer or an autoimmune disease comprising administering a liposome that comprises neutral phospholipids and a P-ethoxy oligonucleotide that targets a IGF-1R-encoding polynucleotide.

4 Claims, 1 Drawing Sheet
Specification includes a Sequence Listing.

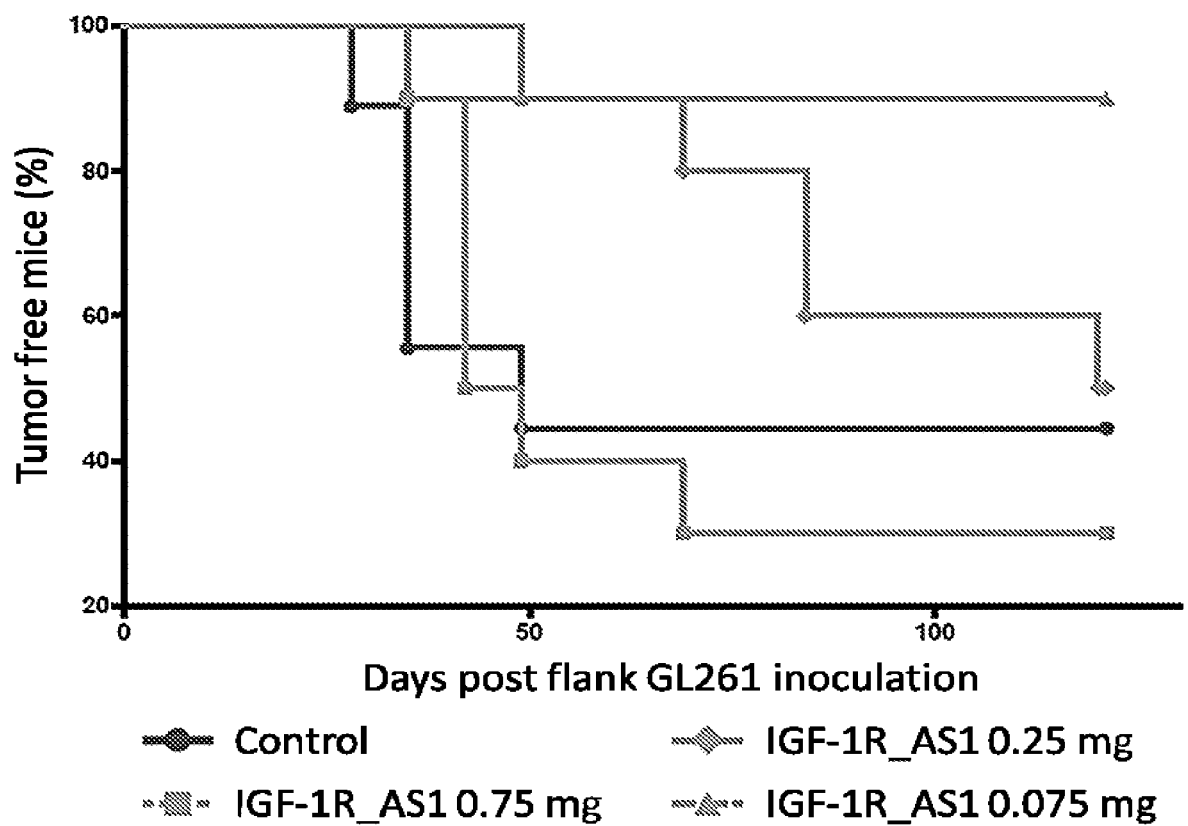

SEQUENCE LISTING

<160> NUMBER OF SEQ ID NOS: 4

<210> SEQ ID NO 1
<211> LENGTH: 18
<212> TYPE: DNA
<213> ORGANISM: Artificial Sequence
<220> FEATURE:
<223> OTHER INFORMATION: Synthetic polynucleotide

<400> SEQUENCE: 1
tcctccggag ccagactt                                                        18

<210> SEQ ID NO 2
<211> LENGTH: 18
<212> TYPE: DNA
<213> ORGANISM: Artificial Sequence
<220> FEATURE:
<223> OTHER INFORMATION: Synthetic polynucleotide

<400> SEQUENCE: 2
ggaccctcct ccggagcc                                                        18

<210> SEQ ID NO 3
<211> LENGTH: 12262
<212> TYPE: DNA
<213> ORGANISM: Homo sapiens
<220> FEATURE:
<221> NAME/KEY: CDS
<222> LOCATION: (1044)..(5147)

<400> SEQUENCE: 3

```
agtgtgtggc agcggcggcg gcggcgcggc gaggctgggg ctcttgttta ccagcattaa          60
ctccgctgag cggaaaaaaa aagggaaaaa acccgaggag gagcgagcgc accaggcgaa         120
ctcgagagag gcgggagagc gagagggacg ccgccagcga gcctgcccac ggccggcgct         180
cgcagaccct cggccccgct ccccggatcc ccccgcgccc tccacgcccc tcccgcgcgg         240
gggcagctcc acgcgcgcc tcgcctcggc tgtgaccttc agcgagccgg agccccgcg          300 cagagcaggc ggcggcgggc ggggggccggg cgggggccgg cgcggggcgg gcggcggcgc         360
agagccgggc ggcgcggcgg gagtgctgag cgcggcgcgg ccggcccgcc gctttgtgtg         420
tgtcctggat ttgggaagga gctcgccgcg gcggcggcgg cgctgaggga ggaggcggcg         480
gcgagcggag ccaggaggag gaggaggagg gggagccgct cattcatttt gactccgcgt         540 ttctgccccct cgccggcctc gcctgtgacc cggacttcgg ggcgatcttg cgaactgcgt        600
cgcgccctcc cgcggcggaa gctcgggcgt ccggccgcct cccgcgcggc cagggccggg         660 cttgttttc ctcgcctagg cagatttggg cttttgcccc tttctttgca gttttccccc          720
cttcctgcct ctccgggttt gaaaatggag gccgacgacg ccgacagccc gccccggcgc        780
gcctcgggtt cccgactccg ccgagccctg ggccgctgct gccggcgctg aggggccgcc        840
ccgcgccgcc cgcccgtcc gcgcaccgg agggccccgg cggcgccgcc ttcggagtat         900
tgtttccttc gcccttgttt ttggaggggg agcgaagact gagtttgaga cttgtttcct         960
ttcatttcct tttttctttt ctttttcttt tttttttttt ttttttttttt tgagaaaggg       1020 gaatttcatc ccaaataaaa gga atg aag tct ggc tcc gga gga ggg tcc ccg      1073
                       Met Lys Ser Gly Ser Gly Gly Gly Ser Pro
                        1               5                  10 acc tcg ctg tgg ggg ctc ctg ttt ctc tcc gcc gcg ctc tcg ctc tgg           1121
Thr Ser Leu Trp Gly Leu Leu Phe Leu Ser Ala Ala Leu Ser Leu Trp
                 15                  20                  25 ccg acg agt gga gaa atc tgc ggg cca ggc atc gac atc cgc aac gac           1169
Pro Thr Ser Gly Glu Ile Cys Gly Pro Gly Ile Asp Ile Arg Asn Asp
         30                  35                  40 tat cag cag ctg aag cgc ctg gag aac tgc acg gtg atc gag ggc tac           1217
Tyr Gln Gln Leu Lys Arg Leu Glu Asn Cys Thr Val Ile Glu Gly Tyr
     45                  50                  55 ctc cac atc ctg ctc atc tcc aag gcc gag gac tac cgc agc tac cgc           1265
```

-continued

| | | | | | | | | | | | | | |
|---|---|---|---|---|---|---|---|---|---|---|---|---|---|
| Leu | His | Ile | Leu | Leu | Ile | Ser | Lys | Ala | Glu | Asp | Tyr | Arg | Ser | Tyr | Arg |
| | 60 | | | | | 65 | | | | | 70 | | | | |

```
ttc ccc aag ctc acg gtc att acc gag tac ttg ctg ctg ttc cga gtg    1313
Phe Pro Lys Leu Thr Val Ile Thr Glu Tyr Leu Leu Leu Phe Arg Val
75              80              85                  90 gct ggc ctc gag agc ctc gga gac ctc ttc ccc aac ctc acg gtc atc    1361
Ala Gly Leu Glu Ser Leu Gly Asp Leu Phe Pro Asn Leu Thr Val Ile
                95              100             105 cgc ggc tgg aaa ctc ttc tac aac tac gcc ctg gtc atc ttc gag atg    1409
Arg Gly Trp Lys Leu Phe Tyr Asn Tyr Ala Leu Val Ile Phe Glu Met
            110             115             120 acc aat ctc aag gat att ggg ctt tac aac ctg agg aac att act cgg    1457
Thr Asn Leu Lys Asp Ile Gly Leu Tyr Asn Leu Arg Asn Ile Thr Arg
        125             130             135 ggg gcc atc agg att gag aaa aat gct gac ctc tgt tac ctc tcc act    1505
Gly Ala Ile Arg Ile Glu Lys Asn Ala Asp Leu Cys Tyr Leu Ser Thr
    140             145             150 gtg gac tgg tcc ctg atc ctg gat gcg gtg tcc aat aac tac att gtg    1553
Val Asp Trp Ser Leu Ile Leu Asp Ala Val Ser Asn Asn Tyr Ile Val
155             160             165             170 ggg aat aag ccc cca aag gaa tgt ggg gac ctg tgt cca ggg acc atg    1601
Gly Asn Lys Pro Pro Lys Glu Cys Gly Asp Leu Cys Pro Gly Thr Met
                175             180             185 gag gag aag ccg atg tgt gag aag acc acc atc aac aat gag tac aac    1649
Glu Glu Lys Pro Met Cys Glu Lys Thr Thr Ile Asn Asn Glu Tyr Asn
            190             195             200 tac cgc tgc tgg acc aca aac cgc tgc cag aaa atg tgc cca agc acg    1697
Tyr Arg Cys Trp Thr Thr Asn Arg Cys Gln Lys Met Cys Pro Ser Thr
        205             210             215 tgt ggg aag cgg gcg tgc acc gag aac aat gag tgc tgc cac ccc gag    1745
Cys Gly Lys Arg Ala Cys Thr Glu Asn Asn Glu Cys Cys His Pro Glu
    220             225             230 tgc ctg ggc agc tgc agc gcg cct gac aac gac acg gcc tgt gta gct    1793
Cys Leu Gly Ser Cys Ser Ala Pro Asp Asn Asp Thr Ala Cys Val Ala
235             240             245             250 tgc cgc cac tac tac tat gcc ggt gtc tgt gtg cct gcc tgc ccg ccc    1841
Cys Arg His Tyr Tyr Tyr Ala Gly Val Cys Val Pro Ala Cys Pro Pro
                255             260             265 aac acc tac agg ttt gag ggc tgg cgc tgt gtg gac cgt gac ttc tgc    1889
Asn Thr Tyr Arg Phe Glu Gly Trp Arg Cys Val Asp Arg Asp Phe Cys
            270             275             280 gcc aac atc ctc agc gcc gag agc agc gac tcc gag ggg ttt gtg atc    1937
Ala Asn Ile Leu Ser Ala Glu Ser Ser Asp Ser Glu Gly Phe Val Ile
        285             290             295 cac gac ggc gag tgc atg cag gag tgc ccc tcg ggc ttc atc cgc aac    1985
His Asp Gly Glu Cys Met Gln Glu Cys Pro Ser Gly Phe Ile Arg Asn
    300             305             310 ggc agc cag agc atg tac tgc atc cct tgt gaa ggt cct tgc ccg aag    2033
Gly Ser Gln Ser Met Tyr Cys Ile Pro Cys Glu Gly Pro Cys Pro Lys
315             320             325             330 gtc tgt gag gaa gaa aag aaa aca aag acc att gat tct gtt act tct    2081
Val Cys Glu Glu Glu Lys Lys Thr Lys Thr Ile Asp Ser Val Thr Ser
                335             340             345 gct cag atg ctc caa gga tgc acc atc ttc aag ggc aat ttg ctc att    2129
Ala Gln Met Leu Gln Gly Cys Thr Ile Phe Lys Gly Asn Leu Leu Ile
            350             355             360 aac atc cga cgg ggg aat aac att gct tca gag ctg gag aac ttc atg    2177
Asn Ile Arg Arg Gly Asn Asn Ile Ala Ser Glu Leu Glu Asn Phe Met
        365             370             375
```

```
ggg ctc atc gag gtg gtg acg ggc tac gtg aag atc cgc cat tct cat    2225
Gly Leu Ile Glu Val Val Thr Gly Tyr Val Lys Ile Arg His Ser His
380                 385                 390 gcc ttg gtc tcc ttg tcc ttc cta aaa aac ctt cgc ctc atc cta gga    2273
Ala Leu Val Ser Leu Ser Phe Leu Lys Asn Leu Arg Leu Ile Leu Gly
395                 400                 405                 410 gag gag cag cta gaa ggg aat tac tcc ttc tac gtc ctc gac aac cag    2321
Glu Glu Gln Leu Glu Gly Asn Tyr Ser Phe Tyr Val Leu Asp Asn Gln
            415                 420                 425 aac ttg cag caa ctg tgg gac tgg gac cac cgc aac ctg acc atc aaa    2369
Asn Leu Gln Gln Leu Trp Asp Trp Asp His Arg Asn Leu Thr Ile Lys
                430                 435                 440 gca ggg aaa atg tac ttt gct ttc aat ccc aaa tta tgt gtt tcc gaa    2417
Ala Gly Lys Met Tyr Phe Ala Phe Asn Pro Lys Leu Cys Val Ser Glu
            445                 450                 455 att tac cgc atg gag gaa gtg acg ggg act aaa ggg cgc caa agc aaa    2465
Ile Tyr Arg Met Glu Glu Val Thr Gly Thr Lys Gly Arg Gln Ser Lys
460                 465                 470 ggg gac ata aac acc agg aac aac ggg gag aga gcc tcc tgt gaa agt    2513
Gly Asp Ile Asn Thr Arg Asn Asn Gly Glu Arg Ala Ser Cys Glu Ser
475                 480                 485                 490 gac gtc ctg cat ttc acc tcc acc acc acg tcg aag aat cgc atc atc    2561
Asp Val Leu His Phe Thr Ser Thr Thr Thr Ser Lys Asn Arg Ile Ile
                495                 500                 505 ata acc tgg cac cgg tac cgg ccc cct gac tac agg gat ctc atc agc    2609
Ile Thr Trp His Arg Tyr Arg Pro Pro Asp Tyr Arg Asp Leu Ile Ser
            510                 515                 520 ttc acc gtt tac tac aag gaa gca ccc ttt aag aat gtc aca gag tat    2657
Phe Thr Val Tyr Tyr Lys Glu Ala Pro Phe Lys Asn Val Thr Glu Tyr
                525                 530                 535 gat ggg cag gat gcc tgc ggc tcc aac agc tgg aac atg gtg gac gtg    2705
Asp Gly Gln Asp Ala Cys Gly Ser Asn Ser Trp Asn Met Val Asp Val
            540                 545                 550 gac ctc ccg ccc aac aag gac gtg gag ccc ggc atc tta cta cat ggg    2753
Asp Leu Pro Pro Asn Lys Asp Val Glu Pro Gly Ile Leu Leu His Gly
555                 560                 565                 570 ctg aag ccc tgg act cag tac gcc gtt tac gtc aag gct gtg acc ctc    2801
Leu Lys Pro Trp Thr Gln Tyr Ala Val Tyr Val Lys Ala Val Thr Leu
                575                 580                 585 acc atg gtg gag aac gac cat atc cgt ggg gcc aag agt gag atc ttg    2849
Thr Met Val Glu Asn Asp His Ile Arg Gly Ala Lys Ser Glu Ile Leu
            590                 595                 600 tac att cgc acc aat gct tca gtt cct tcc att ccc ttg gac gtt ctt    2897
Tyr Ile Arg Thr Asn Ala Ser Val Pro Ser Ile Pro Leu Asp Val Leu
                605                 610                 615 tca gca tcg aac tcc tct tct cag tta atc gtg aag tgg aac cct ccc    2945
Ser Ala Ser Asn Ser Ser Ser Gln Leu Ile Val Lys Trp Asn Pro Pro
            620                 625                 630 tct ctg ccc aac ggc aac ctg agt tac tac att gtg cgc tgg cag cgg    2993
Ser Leu Pro Asn Gly Asn Leu Ser Tyr Tyr Ile Val Arg Trp Gln Arg
635                 640                 645                 650 cag cct cag gac ggc tac ctt tac cgg cac aat tac tgc tcc aaa gac    3041
Gln Pro Gln Asp Gly Tyr Leu Tyr Arg His Asn Tyr Cys Ser Lys Asp
            655                 660                 665 aaa atc ccc atc agg aag tat gcc gac ggc acc atc gac att gag gag    3089
Lys Ile Pro Ile Arg Lys Tyr Ala Asp Gly Thr Ile Asp Ile Glu Glu
                670                 675                 680 gtc aca gag aac ccc aag act gag gtg tgt ggt ggg gag aaa ggg cct    3137
Val Thr Glu Asn Pro Lys Thr Glu Val Cys Gly Gly Glu Lys Gly Pro
            685                 690                 695
```

```
tgc tgc gcc tgc ccc aaa act gaa gcc gag aag cag gcc gag aag gag    3185
Cys Cys Ala Cys Pro Lys Thr Glu Ala Glu Lys Gln Ala Glu Lys Glu
700                 705                 710 gag gct gaa tac cgc aaa gtc ttt gag aat ttc ctg cac aac tcc atc    3233
Glu Ala Glu Tyr Arg Lys Val Phe Glu Asn Phe Leu His Asn Ser Ile
715                 720                 725                 730 ttc gtg ccc aga cct gaa agg aag cgg aga gat gtc atg caa gtg gcc    3281
Phe Val Pro Arg Pro Glu Arg Lys Arg Arg Asp Val Met Gln Val Ala
            735                 740                 745 aac acc acc atg tcc agc cga agc agg aac acc acg gcc gca gac acc    3329
Asn Thr Thr Met Ser Ser Arg Ser Arg Asn Thr Thr Ala Ala Asp Thr
                750                 755                 760 tac aac atc acc gac ccg gaa gag ctg gag aca gag tac cct ttc ttt    3377
Tyr Asn Ile Thr Asp Pro Glu Glu Leu Glu Thr Glu Tyr Pro Phe Phe
            765                 770                 775 gag agc aga gtg gat aac aag gag aga act gtc att tct aac ctt cgg    3425
Glu Ser Arg Val Asp Asn Lys Glu Arg Thr Val Ile Ser Asn Leu Arg
780                 785                 790 cct ttc aca ttg tac cgc atc gat atc cac agc tgc aac cac gag gct    3473
Pro Phe Thr Leu Tyr Arg Ile Asp Ile His Ser Cys Asn His Glu Ala
795                 800                 805                 810 gag aag ctg ggc tgc agc gcc tcc aac ttc gtc ttt gca agg act atg    3521
Glu Lys Leu Gly Cys Ser Ala Ser Asn Phe Val Phe Ala Arg Thr Met
                815                 820                 825 ccc gca gaa gga gca gat gac att cct ggg cca gtg acc tgg gag cca    3569
Pro Ala Glu Gly Ala Asp Asp Ile Pro Gly Pro Val Thr Trp Glu Pro
            830                 835                 840 agg cct gaa aac tcc atc ttt tta aag tgg ccg gaa cct gag aat ccc    3617
Arg Pro Glu Asn Ser Ile Phe Leu Lys Trp Pro Glu Pro Glu Asn Pro
        845                 850                 855 aat gga ttg att cta atg tat gaa ata aaa tac gga tca caa gtt gag    3665
Asn Gly Leu Ile Leu Met Tyr Glu Ile Lys Tyr Gly Ser Gln Val Glu
860                 865                 870 gat cag cga gaa tgt gtg tcc aga cag gaa tac agg aag tat gga ggg    3713
Asp Gln Arg Glu Cys Val Ser Arg Gln Glu Tyr Arg Lys Tyr Gly Gly
875                 880                 885                 890 gcc aag cta aac cgg cta aac ccg ggg aac tac aca gcc cgg att cag    3761
Ala Lys Leu Asn Arg Leu Asn Pro Gly Asn Tyr Thr Ala Arg Ile Gln
                895                 900                 905 gcc aca tct ctc tct ggg aat ggg tcg tgg aca gat cct gtg ttc ttc    3809
Ala Thr Ser Leu Ser Gly Asn Gly Ser Trp Thr Asp Pro Val Phe Phe
            910                 915                 920 tat gtc cag gcc aaa aca gga tat gaa aac ttc atc cat ctg atc atc    3857
Tyr Val Gln Ala Lys Thr Gly Tyr Glu Asn Phe Ile His Leu Ile Ile
        925                 930                 935 gct ctg ccc gtc gct gtc ctg ttg atc gtg gga ggg ttg gtg att atg    3905
Ala Leu Pro Val Ala Val Leu Leu Ile Val Gly Gly Leu Val Ile Met
940                 945                 950 ctg tac gtc ttc cat aga aag aga aat aac agc agg ctg ggg aat gga    3953
Leu Tyr Val Phe His Arg Lys Arg Asn Asn Ser Arg Leu Gly Asn Gly
955                 960                 965                 970 gtg ctg tat gcc tct gtg aac ccg gag tac ttc agc gct gct gat gtg    4001
Val Leu Tyr Ala Ser Val Asn Pro Glu Tyr Phe Ser Ala Ala Asp Val
                975                 980                 985 tac gtt cct gat gag tgg gag gtg gct cgg gag aag atc acc atg agc    4049
Tyr Val Pro Asp Glu Trp Glu Val Ala Arg Glu Lys Ile Thr Met Ser
            990                 995                 1000 cgg gaa ctt ggg cag ggg tcg ttt ggg atg gtc tat gaa gga gtt        4094
Arg Glu Leu Gly Gln Gly Ser Phe Gly Met Val Tyr Glu Gly Val
```

-continued

|  |  |  |  |  |  |  |  |  |  |  |  |  |
|---|---|---|---|---|---|---|---|---|---|---|---|---|
|  |  | 1005 |  |  |  | 1010 |  |  |  | 1015 |  |  |
| gcc | aag | ggt | gtg | gtg | aaa | gat | gaa | cct | gaa | acc | aga | gtg | gcc | att | 4139 |
| Ala | Lys | Gly | Val | Val | Lys | Asp | Glu | Pro | Glu | Thr | Arg | Val | Ala | Ile |  |
|  |  | 1020 |  |  |  | 1025 |  |  |  | 1030 |  |  |
| aaa | aca | gtg | aac | gag | gcc | gca | agc | atg | cgt | gag | agg | att | gag | ttt | 4184 |
| Lys | Thr | Val | Asn | Glu | Ala | Ala | Ser | Met | Arg | Glu | Arg | Ile | Glu | Phe |  |
|  |  | 1035 |  |  |  | 1040 |  |  |  | 1045 |  |  |
| ctc | aac | gaa | gct | tct | gtg | atg | aag | gag | ttc | aat | tgt | cac | cat | gtg | 4229 |
| Leu | Asn | Glu | Ala | Ser | Val | Met | Lys | Glu | Phe | Asn | Cys | His | His | Val |  |
|  |  | 1050 |  |  |  | 1055 |  |  |  | 1060 |  |  |
| gtg | cga | ttg | ctg | ggt | gtg | gtg | tcc | caa | ggc | cag | cca | aca | ctg | gtc | 4274 |
| Val | Arg | Leu | Leu | Gly | Val | Val | Ser | Gln | Gly | Gln | Pro | Thr | Leu | Val |  |
|  |  | 1065 |  |  |  | 1070 |  |  |  | 1075 |  |  |
| atc | atg | gaa | ctg | atg | aca | cgg | ggc | gat | ctc | aaa | agt | tat | ctc | cgg | 4319 |
| Ile | Met | Glu | Leu | Met | Thr | Arg | Gly | Asp | Leu | Lys | Ser | Tyr | Leu | Arg |  |
|  |  | 1080 |  |  |  | 1085 |  |  |  | 1090 |  |  |
| tct | ctg | agg | cca | gaa | atg | gag | aat | aat | cca | gtc | cta | gca | cct | cca | 4364 |
| Ser | Leu | Arg | Pro | Glu | Met | Glu | Asn | Asn | Pro | Val | Leu | Ala | Pro | Pro |  |
|  |  | 1095 |  |  |  | 1100 |  |  |  | 1105 |  |  |
| agc | ctg | agc | aag | atg | att | cag | atg | gcc | gga | gag | att | gca | gac | ggc | 4409 |
| Ser | Leu | Ser | Lys | Met | Ile | Gln | Met | Ala | Gly | Glu | Ile | Ala | Asp | Gly |  |
|  |  | 1110 |  |  |  | 1115 |  |  |  | 1120 |  |  |
| atg | gca | tac | ctc | aac | gcc | aat | aag | ttc | gtc | cac | aga | gac | ctt | gct | 4454 |
| Met | Ala | Tyr | Leu | Asn | Ala | Asn | Lys | Phe | Val | His | Arg | Asp | Leu | Ala |  |
|  |  | 1125 |  |  |  | 1130 |  |  |  | 1135 |  |  |
| gcc | cgg | aat | tgc | atg | gta | gcc | gaa | gat | ttc | aca | gtc | aaa | atc | gga | 4499 |
| Ala | Arg | Asn | Cys | Met | Val | Ala | Glu | Asp | Phe | Thr | Val | Lys | Ile | Gly |  |
|  |  | 1140 |  |  |  | 1145 |  |  |  | 1150 |  |  |
| gat | ttt | ggt | atg | acg | cga | gat | atc | tat | gag | aca | gac | tat | tac | cgg | 4544 |
| Asp | Phe | Gly | Met | Thr | Arg | Asp | Ile | Tyr | Glu | Thr | Asp | Tyr | Tyr | Arg |  |
|  |  | 1155 |  |  |  | 1160 |  |  |  | 1165 |  |  |
| aaa | gga | ggg | aaa | ggg | ctg | ctg | ccc | gtg | cgc | tgg | atg | tct | cct | gag | 4589 |
| Lys | Gly | Gly | Lys | Gly | Leu | Leu | Pro | Val | Arg | Trp | Met | Ser | Pro | Glu |  |
|  |  | 1170 |  |  |  | 1175 |  |  |  | 1180 |  |  |
| tcc | ctc | aag | gat | gga | gtc | ttc | acc | act | tac | tcg | gac | gtc | tgg | tcc | 4634 |
| Ser | Leu | Lys | Asp | Gly | Val | Phe | Thr | Thr | Tyr | Ser | Asp | Val | Trp | Ser |  |
|  |  | 1185 |  |  |  | 1190 |  |  |  | 1195 |  |  |
| ttc | ggg | gtc | gtc | ctc | tgg | gag | atc | gcc | aca | ctg | gcc | gag | cag | ccc | 4679 |
| Phe | Gly | Val | Val | Leu | Trp | Glu | Ile | Ala | Thr | Leu | Ala | Glu | Gln | Pro |  |
|  |  | 1200 |  |  |  | 1205 |  |  |  | 1210 |  |  |
| tac | cag | ggc | ttg | tcc | aac | gag | caa | gtc | ctt | cgc | ttc | gtc | atg | gag | 4724 |
| Tyr | Gln | Gly | Leu | Ser | Asn | Glu | Gln | Val | Leu | Arg | Phe | Val | Met | Glu |  |
|  |  | 1215 |  |  |  | 1220 |  |  |  | 1225 |  |  |
| ggc | ggc | ctt | ctg | gac | aag | cca | gac | aac | tgt | cct | gac | atg | ctg | ttt | 4769 |
| Gly | Gly | Leu | Leu | Asp | Lys | Pro | Asp | Asn | Cys | Pro | Asp | Met | Leu | Phe |  |
|  |  | 1230 |  |  |  | 1235 |  |  |  | 1240 |  |  |
| gaa | ctg | atg | cgc | atg | tgc | tgg | cag | tat | aac | ccc | aag | atg | agg | cct | 4814 |
| Glu | Leu | Met | Arg | Met | Cys | Trp | Gln | Tyr | Asn | Pro | Lys | Met | Arg | Pro |  |
|  |  | 1245 |  |  |  | 1250 |  |  |  | 1255 |  |  |
| tcc | ttc | ctg | gag | atc | atc | agc | agc | atc | aaa | gag | gag | atg | gag | cct | 4859 |
| Ser | Phe | Leu | Glu | Ile | Ile | Ser | Ser | Ile | Lys | Glu | Glu | Met | Glu | Pro |  |
|  |  | 1260 |  |  |  | 1265 |  |  |  | 1270 |  |  |
| ggc | ttc | cgg | gag | gtc | tcc | ttc | tac | tac | agc | gag | gag | aac | aag | ctg | 4904 |
| Gly | Phe | Arg | Glu | Val | Ser | Phe | Tyr | Tyr | Ser | Glu | Glu | Asn | Lys | Leu |  |
|  |  | 1275 |  |  |  | 1280 |  |  |  | 1285 |  |  |
| ccc | gag | ccg | gag | gag | ctg | gac | ctg | gag | cca | gag | aac | atg | gag | agc | 4949 |
| Pro | Glu | Pro | Glu | Glu | Leu | Asp | Leu | Glu | Pro | Glu | Asn | Met | Glu | Ser |  |
|  |  | 1290 |  |  |  | 1295 |  |  |  | 1300 |  |  |
| gtc | ccc | ctg | gac | ccc | tcg | gcc | tcc | tcg | tcc | tcc | ctg | cca | ctg | ccc | 4994 |

|  |  |
|---|---|
| Val Pro Leu Asp Pro Ser Ala Ser Ser Ser Leu Pro Leu Pro<br>1305                             1310                    1315 |  |
| gac aga cac tca gga cac aag gcc gag aac ggc ccc ggc cct ggg<br>Asp Arg His Ser Gly His Lys Ala Glu Asn Gly Pro Gly Pro Gly<br>           1320                       1325                   1330 | 5039 |
| gtg ctg gtc ctc cgc gcc agc ttc gac gag aga cag cct tac gcc<br>Val Leu Val Leu Arg Ala Ser Phe Asp Glu Arg Gln Pro Tyr Ala<br>           1335                       1340                   1345 | 5084 |
| cac atg aac ggg ggc cgc aag aac gag cgg gcc ttg ccg ctg ccc<br>His Met Asn Gly Gly Arg Lys Asn Glu Arg Ala Leu Pro Leu Pro<br>           1350                       1355                   1360 | 5129 |
| cag tct tcg acc tgc tga tccttggatc ctgaatctgt gcaaacagta<br>Gln Ser Ser Thr Cys<br>           1365 | 5177 |
| acgtgtgcgc acgcgcagcg gggtggggggg ggagagagag ttttaacaat ccattcacaa | 5237 |
| gcctcctgta cctcagtgga tcttcagaac tgcccttgct gcccgcggga gacagcttct | 5297 |
| ctgcagtaaa acacatttgg gatgttcctt ttttcaatat gcaagcagct ttttattccc | 5357 |
| tgcccaaacc cttaactgac atgggccttt aagaacctta atgacaacac ttaatagcaa | 5417 |
| cagagcactt gagaaccagt ctcctcactc tgtccctgtc cttccctgtt ctccctttct | 5477 |
| ctctcctctc tgcttcataa cggaaaaata attgccacaa gtccagctgg gaagcccttt | 5537 |
| ttatcagttt gaggaagtgg ctgtccctgt ggccccatcc aaccactgta cacacccgcc | 5597 |
| tgacaccgtg ggtcattaca aaaaaacacg tggagatgga aattttttacc tttatctttc | 5657 |
| acctttctag ggacatgaaa tttacaaagg gccatcgttc atccaaggct gttaccattt | 5717 |
| taacgctgcc taattttgcc aaaatcctga actttctccc tcatcggccc ggcgctgatt | 5777 |
| cctcgtgtcc ggaggcatgg gtgagcatgg cagctggttg ctccatttga gagacacgct | 5837 |
| ggcgacacac tccgtccatc cgactgcccc tgctgtgctg ctcaaggcca caggcacaca | 5897 |
| ggtctcattg cttctgacta gattattatt tgggggaact ggacacaata ggtctttctc | 5957 |
| tcagtgaagg tggggagaag ctgaaccggc ttccctgccc tgcctcccca gcccctgcc | 6017 |
| caaccccaa gaatctggtg gccatgggcc ccgaagcagc ctggcggaca ggcttggagt | 6077 |
| caaggggccc catgcctgct tctctcccag ccccagctcc ccgcccgcc cccaaggaca | 6137 |
| cagatgggaa ggggtttcca gggactcagc cccactgttg atgcaggttt gcaaggaaag | 6197 |
| aaattcaaac accacaacag cagtaagaag aaaagcagtc aatggattca agcattctaa | 6257 |
| gctttgttga catttttctct gttcctagga cttcttcatg ggtcttacag ttctatgtta | 6317 |
| gaccatgaaa catttgcata cacatcgtct ttaatgtcac ttttataact tttttacggt | 6377 |
| tcagatattc atctatacgt ctgtacagaa aaaaaaaagc tgctattttt tttgttcttg | 6437 |
| atctttgtgg atttaatcta tgaaaacctt caggtccacc ctctcccctt tctgctcact | 6497 |
| ccaagaaact tcttatgctt tgtactagag tgcgtgactt tcttcctctt ttcccggtaa | 6557 |
| tggatacttc tatcacataa tttgccatga actgttggat gcctttttat aaatacatcc | 6617 |
| cccatccctg ctcccacctg cccctttagt tgttttctaa cccgtaggct ctctgggcac | 6677 |
| gaggcagaaa gcaggccggg cacccatcct gagagggccg cgctcctctc cccagcctgc | 6737 |
| cctcacagca ttggagcctg ttacagtgca agacatgata caaactcagg tcagaaaaac | 6797 |
| aaaggttaaa tatttcacac gtctttgttc agtgtttcca ctcaccgtgg ttgagaagcc | 6857 |
| tcaccctctc tttcccttgc ctttgcttag gttgtgacac acatatatat atatttttttt | 6917 |
| aattcttggg tacaacagca gtgttaaccg cagacactag gcatttggat tactatttttt | 6977 |

-continued

```
cttaatggct atttaatcct tccatcccac gaaaaacagc tgctgagtcc aagggagcag    7037
cagagcgtgg tccggcaggg cctgttgtgg ccctcgccac cccctcacc ggaccgactg    7097 acctgtcttt ggaaccagaa catcccaagg gaactccttc gcactggcgt tgagtgggac    7157
cccgggatcc aggctggccc agggcggcac cctcagggct gtgcccgctg gagtgctagg    7217
tggaggcagc acagacgcca cggtggccca agagcccctt tgcttcttgc tgggggacca    7277
gggctgtggt gctggcccac tttccctcgg ccaggaatcc aggtccttgg ggcccagggg    7337
tcttgtcttg tttcattttt agcacttctc accagagaga tgacagcaca agagttgctt    7397
ctgggataga aatgtttagg agtaagaaca aagctgggat acggtgattg ctagttgtga    7457
ctgaagattc aacacagaaa agaaagttta tacggctttt ttgctggtca gcagtttgtc    7517
ccactgcttt ctctagtctc tatcccatag cgtgttccct ttaaaaaaaa aaaaaaggta    7577
ttatatgtag gagttttctt ttaatttatt ttgtgataaa ttaccagttt caatcactgt    7637
agaaaagccc cattatgaat ttaaatttca aggaaagggt gtgtgtgtgt gtatgtgtgg    7697
ggtgtgtgtg tgtgagagtg atgggacagt tcttgatttt ttgggttttt tttcccccaa    7757
acatttatct acctcactct tatttttat atgtgtatat agacaaaaga atacatctca    7817
cctttctcag cacctgacaa taggccgttg atactggtaa cctcatccac gccacaggcg    7877
ccacacccag gtgatgcagg gggaagccag gctgtattcc ggggtcaaag caacactaac    7937
tcacctctct gctcatttca gacagcttgc cttttttctga gatgtcctgt tttgtgttgc    7997 ttttttttgtt ttgttttcta tcttggtttc caccaaggtg ttagatttct cctcctccta    8057
gccaggtggc cctgtgaggc caacgagggc accagagcac acctggggga gccaccaggc    8117
tgtccctggc tggttgtctt tggaacaaac tgcttctgtg cagatggaat gaccaacaca    8177
tttcgtcctt aagagagcag tggttcctca ggttctgagg agaggaaggt gtccaggcag    8237
caccatctct gtgcgaatcc ccagggtaaa ggcgtgggc attgggtttg ctccccttgc    8297
tgctgctcca tccctgcagg aggctcgcgc tgaggcagga ccgtgcggcc atggctgctg    8357
cattcattga gcacaaaggt gcagctgcag cagcagctgg agagcaagag tcacccagcc    8417
tgtgcgccag aatgcagagg ctcctgacct cacagccagt ccctgataga acacacgcag    8477
gagcagagtc ccctccccct ccaggctgcc ctctcaactt ctccctcacc tccttcccta    8537
ggggtagaca gagatgtacc aaaccttccg gctggaaagc ccagtggccg gcgccgaggc    8597
tcgtggcgtc acgcccccc cgccagggct gtacctccgt ctccctggtc ctgctgctca    8657
caggacagac ggctcgctcc cctcttccag cagctgctct tacaggcact gatgatttcg    8717
ctgggaagtg tggcgggcag cttttgcctaa gcgtggatgg ctcctcggca attccagcct    8777
aagtgaaggc gctcaggagc ctcctgctgg aacgcgaccc atctctccca ggaccccggg    8837
gatcttaagg tcattgagaa atactgttgg atcagggttt tgttcttcca cactgtaggt    8897
gacccctggg aataacggcc tctcctctcg tgcacatacc taccggtttc cacaactgga    8957
tttctacaga tcattcagct ggttataagg gttttgttta aactgtccga gttactgatg    9017
tcattttgtt tttgttttat gtaggtagct tttaagtaga aaacactaac agtgtagtgc    9077
ccatcatagc aaatgcttca gaaacacctc aataaaagag aaaacttggc ttgtgtgatg    9137
gtgcagtcac tttactggac caacccaccc accttgacta taccaaggca tcatctatcc    9197
acagttctag cctaacttca tgctgatttc tctgcctctt gattttctc tgtgtgttcc    9257 aaataatctt aagctgagtt gtggcatttt ccatgcaacc tccttctgcc agcagctcac    9317
actgcttgaa gtcatatgaa ccactgaggc acatcatgga attgatgtga gcattaagac    9377
```

```
gttctcccac acagcccttc cctgaggcag caggagctgg tgtgtactgg agacactgtt    9437
gaacttgatc aagacccaga ccaccccagg tctccttcgt gggatgtcat gacgtttgac    9497 ataccttttgg aacgagcctc ctccttggaa gatggaagac cgtgttcgtg gccgacctgg   9557
cctctcctgg cctgtttctt aagatgcgga gtcacatttc aatggtacga aaagtggctt    9617
cgtaaaatag aagagcagtc actgtggaac taccaaatgg cgagatgctc ggtgcacatt    9677
ggggtgcttt gggataaaag atttatgagc caactattct ctggcaccag attctaggcc    9737
agtttgttcc actgaagctt ttcccacagc agtccacctc tgcaggctgg cagccgaatg    9797
gcttgccagt ggctctgtgg caagatcaca ctgagatcga tgggtgagaa ggctaggatg    9857
cttgtctagt gttcttagct gtcacgttgg ctccttccag ggtggccaga cggtgttggc    9917
cactcccttc taaaacacag gcgccctcct ggtgacagtg acccgccgtg gtatgccttg    9977
gcccattcca gcagtcccag ttatgcattt caagtttggg gtttgttctt ttcgttaatg   10037
ttcctctgtg ttgtcagctg tcttcatttc ctgggctaag cagcattggg agatgtggac   10097
cagagatcca ctccttaaga accagtggcg aaagacactt tctttcttca ctctgaagta   10157
gctggtggta caaatgagaa cttcaagaga ggatgttatt tagactgaac ctctgttgcc   10217
agagatgctg aagatacaga ccttggacag gtcagagggt ttcatttttg gccttcatct   10277
tagatgactg gttgcgtcat ttggagaagt gagtgctcct tgatggtgga atgaccgggt   10337
ggtgggtaca gaaccattgt cacagggatc ctggcacaga aagagttac gagcagcagg    10397 gtgcagggct tggaaggaat gtgggcaagg ttttgaactt gattgttctt gaagctatca   10457
gaccacatcg aggctcagca gtcatccgtg ggcatttggt ttcaacaaag aaacctaaca   10517
tcctactctg gaaactgatc tcggagttaa ggcgaattgt tcaagaacac aaactacatc   10577
gcactcgtca gttgtcagtt ctgggcatg actttagcgt tttgtttctg cgagaacata    10637
acgatcactc attttatgt cccacgtgtg tgtgtccgca tctttctggt caacattgtt    10697
ttaactagtc actcattagc gttttcaata gggctcttaa gtccagtaga ttacgggtag   10757
tcagttgacg aagatctggt ttacaagaac taattaaatg tttcattgca ttttttgtaag  10817 aacagaataa ttttataaaa tgtttgtagt ttataattgc cgaaaataat ttaaagacac   10877
tttttttttc tctgtgtgtg caaatgtgtg tttgtgatcc attttttttt ttttttttta   10937
ggacacctgt ttactagcta gctttacaat atgccaaaaa aggatttctc cctgacccca   10997
tccgtggttc accctctttt cccccatgc ttttttgccct agtttataac aaaggaatga    11057
tgatgattta aaaagtagtt ctgtatcttc agtatcttgg tcttccagaa ccctctggtt   11117
gggaagggga tcattttta ctggtcattt ccctttggag tgtagctact ttaacagatg    11177
gaaagaacct cattggccat ggaaacagcc gaggtgttgg agcccagcag tgcatggcac   11237
cgttcggcat ctggcttgat tggtctggct gccgtcattg tcagcacagt gccatggaca   11297
tgggaagact tgactgcaca gccaatggtt ttcatgatga ttcagcata cacagtgatc    11357 acataaacga tgacagctat ggggcacaca ggccatttgc ttacatgcct cgtatcatga   11417
ctgattactg ctttgttaga acacagaaga gaccctattt tatttaaggc agaaccccga   11477
agatacgtat ttccaataca gaaagaatt tttaataaaa actataacat acacaaaaat    11537
tggttttaaa gttgactcca cttcctctaa ctccagtgga tgttggccca tgtctcccca   11597
actccacaat atctctatca tgggaaacac ctgggggtttt tgcgctacat aggagaaaga  11657 tctggaaaact atttgggttt tgttttcaac ttttcatttg gatgtttggc gttgcacaca  11717
```

-continued

```
cacatccacc ggtggaagag acgcccggtg aaaacacctg tctgctttct aagccagtga    11777
ggttgaggtg agaggtttgc cagagtttgt ctacctctgg gtatccctt  gtctgggata    11837 aaaaaaatca aaccagaagg cgggatggaa tggatgcacc gcaaataatg cattttctga    11897
gttttcttgt taaaaaaaaa ttttttaag  taagaaaaaa aaaggtaata acatggccaa    11957
tttgttacat aaaatgactt tctgtgtata aattattcct aaaaaatcct gtttatataa    12017
aaaatcagta gatgaaaaaa atttcaaaat gttttgtat  attctgttgt aagaatttat    12077
tcctgttatt gcgatatact ctggattctt tacataatgg aaaaagaaa  ctgtctattt    12137 tgaatggctg aagctaaggc aacgttagtt tctcttactc tgctttttc  tagtaaagta    12197 ctacatggtt taagttaaat aaaataattc tgtatgcaaa aaaaaaaaaa aaaaaaaaaa    12257
aaaaa                                                                12262
```

<210> SEQ ID NO 4
<211> LENGTH: 1367
<212> TYPE: PRT
<213> ORGANISM: Homo sapiens

<400> SEQUENCE: 4

```
Met Lys Ser Gly Ser Gly Gly Ser Pro Thr Ser Leu Trp Gly Leu
 1               5                   10                  15

Leu Phe Leu Ser Ala Ala Leu Ser Leu Trp Pro Thr Ser Gly Glu Ile
                20                  25                  30

Cys Gly Pro Gly Ile Asp Ile Arg Asn Asp Tyr Gln Gln Leu Lys Arg
             35                  40                  45

Leu Glu Asn Cys Thr Val Ile Glu Gly Tyr Leu His Ile Leu Leu Ile
        50                  55                  60

Ser Lys Ala Glu Asp Tyr Arg Ser Tyr Arg Phe Pro Lys Leu Thr Val
65                  70                  75                  80

Ile Thr Glu Tyr Leu Leu Leu Phe Arg Val Ala Gly Leu Glu Ser Leu
                    85                  90                  95

Gly Asp Leu Phe Pro Asn Leu Thr Val Ile Arg Gly Trp Lys Leu Phe
                100                 105                 110

Tyr Asn Tyr Ala Leu Val Ile Phe Glu Met Thr Asn Leu Lys Asp Ile
            115                 120                 125

Gly Leu Tyr Asn Leu Arg Asn Ile Thr Arg Gly Ala Ile Arg Ile Glu
        130                 135                 140

Lys Asn Ala Asp Leu Cys Tyr Leu Ser Thr Val Asp Trp Ser Leu Ile
145                 150                 155                 160

Leu Asp Ala Val Ser Asn Asn Tyr Ile Val Gly Asn Lys Pro Pro Lys
                165                 170                 175

Glu Cys Gly Asp Leu Cys Pro Gly Thr Met Glu Glu Lys Pro Met Cys
            180                 185                 190

Glu Lys Thr Thr Ile Asn Asn Glu Tyr Asn Tyr Arg Cys Trp Thr Thr
        195                 200                 205

Asn Arg Cys Gln Lys Met Cys Pro Ser Thr Cys Gly Lys Arg Ala Cys
    210                 215                 220

Thr Glu Asn Asn Glu Cys Cys His Pro Glu Cys Leu Gly Ser Cys Ser
225                 230                 235                 240

Ala Pro Asp Asn Asp Thr Ala Cys Val Ala Cys Arg His Tyr Tyr Tyr
                245                 250                 255

Ala Gly Val Cys Val Pro Ala Cys Pro Pro Asn Thr Tyr Arg Phe Glu
            260                 265                 270
```

```
Gly Trp Arg Cys Val Asp Arg Asp Phe Cys Ala Asn Ile Leu Ser Ala
            275                 280                 285
Glu Ser Ser Asp Ser Glu Gly Phe Val Ile His Asp Gly Glu Cys Met
        290                 295                 300
Gln Glu Cys Pro Ser Gly Phe Ile Arg Asn Gly Ser Gln Ser Met Tyr
305                 310                 315                 320
Cys Ile Pro Cys Glu Gly Pro Cys Pro Lys Val Cys Glu Glu Glu Lys
                325                 330                 335
Lys Thr Lys Thr Ile Asp Ser Val Thr Ser Ala Gln Met Leu Gln Gly
            340                 345                 350
Cys Thr Ile Phe Lys Gly Asn Leu Leu Ile Asn Ile Arg Arg Gly Asn
        355                 360                 365
Asn Ile Ala Ser Glu Leu Glu Asn Phe Met Gly Leu Ile Glu Val Val
370                 375                 380
Thr Gly Tyr Val Lys Ile Arg His Ser His Ala Leu Val Ser Leu Ser
385                 390                 395                 400
Phe Leu Lys Asn Leu Arg Leu Ile Leu Gly Glu Glu Leu Glu Gly
                405                 410                 415
Asn Tyr Ser Phe Tyr Val Leu Asp Asn Gln Asn Leu Gln Gln Leu Trp
            420                 425                 430
Asp Trp Asp His Arg Asn Leu Thr Ile Lys Ala Gly Lys Met Tyr Phe
        435                 440                 445
Ala Phe Asn Pro Lys Leu Cys Val Ser Glu Ile Tyr Arg Met Glu Glu
450                 455                 460
Val Thr Gly Thr Lys Gly Arg Gln Ser Lys Gly Asp Ile Asn Thr Arg
465                 470                 475                 480
Asn Asn Gly Glu Arg Ala Ser Cys Glu Ser Asp Val Leu His Phe Thr
                485                 490                 495
Ser Thr Thr Thr Ser Lys Asn Arg Ile Ile Ile Thr Trp His Arg Tyr
            500                 505                 510
Arg Pro Pro Asp Tyr Arg Asp Leu Ile Ser Phe Thr Val Tyr Tyr Lys
        515                 520                 525
Glu Ala Pro Phe Lys Asn Val Thr Glu Tyr Asp Gly Gln Asp Ala Cys
530                 535                 540
Gly Ser Asn Ser Trp Asn Met Val Asp Val Asp Leu Pro Pro Asn Lys
545                 550                 555                 560
Asp Val Glu Pro Gly Ile Leu Leu His Gly Leu Lys Pro Trp Thr Gln
                565                 570                 575
Tyr Ala Val Tyr Val Lys Ala Val Thr Leu Thr Met Val Glu Asn Asp
            580                 585                 590
His Ile Arg Gly Ala Lys Ser Glu Ile Leu Tyr Ile Arg Thr Asn Ala
        595                 600                 605
Ser Val Pro Ser Ile Pro Leu Asp Val Leu Ser Ala Ser Asn Ser Ser
610                 615                 620
Ser Gln Leu Ile Val Lys Trp Asn Pro Ser Leu Pro Asn Gly Asn
625                 630                 635                 640
Leu Ser Tyr Tyr Ile Val Arg Trp Gln Arg Gln Pro Gln Asp Gly Tyr
                645                 650                 655
Leu Tyr Arg His Asn Tyr Cys Ser Lys Asp Lys Ile Pro Ile Arg Lys
            660                 665                 670
Tyr Ala Asp Gly Thr Ile Asp Ile Glu Glu Val Thr Glu Asn Pro Lys
        675                 680                 685
Thr Glu Val Cys Gly Gly Glu Lys Gly Pro Cys Cys Ala Cys Pro Lys
```

```
            690             695             700
Thr Glu Ala Glu Lys Gln Ala Glu Lys Glu Glu Ala Glu Tyr Arg Lys
705             710             715             720

Val Phe Glu Asn Phe Leu His Asn Ser Ile Phe Val Pro Arg Pro Glu
                725             730             735

Arg Lys Arg Arg Asp Val Met Gln Val Ala Asn Thr Thr Met Ser Ser
                740             745             750

Arg Ser Arg Asn Thr Thr Ala Ala Asp Thr Tyr Asn Ile Thr Asp Pro
            755             760             765

Glu Glu Leu Glu Thr Glu Tyr Pro Phe Phe Glu Ser Arg Val Asp Asn
770             775             780

Lys Glu Arg Thr Val Ile Ser Asn Leu Arg Pro Phe Thr Leu Tyr Arg
785             790             795             800

Ile Asp Ile His Ser Cys Asn His Glu Ala Lys Leu Gly Cys Ser
                805             810             815

Ala Ser Asn Phe Val Phe Ala Arg Thr Met Pro Ala Glu Gly Ala Asp
            820             825             830

Asp Ile Pro Gly Pro Val Thr Trp Glu Pro Arg Pro Glu Asn Ser Ile
            835             840             845

Phe Leu Lys Trp Pro Glu Pro Glu Asn Pro Asn Gly Leu Ile Leu Met
850             855             860

Tyr Glu Ile Lys Tyr Gly Ser Gln Val Glu Asp Gln Arg Glu Cys Val
865             870             875             880

Ser Arg Gln Glu Tyr Arg Lys Tyr Gly Gly Ala Lys Leu Asn Arg Leu
                885             890             895

Asn Pro Gly Asn Tyr Thr Ala Arg Ile Gln Ala Thr Ser Leu Ser Gly
                900             905             910

Asn Gly Ser Trp Thr Asp Pro Val Phe Phe Tyr Val Gln Ala Lys Thr
            915             920             925

Gly Tyr Glu Asn Phe Ile His Leu Ile Ile Ala Leu Pro Val Ala Val
            930             935             940

Leu Leu Ile Val Gly Gly Leu Val Ile Met Leu Tyr Val Phe His Arg
945             950             955             960

Lys Arg Asn Asn Ser Arg Leu Gly Asn Gly Val Leu Tyr Ala Ser Val
                965             970             975

Asn Pro Glu Tyr Phe Ser Ala Ala Asp Val Tyr Val Pro Asp Glu Trp
            980             985             990

Glu Val Ala Arg Glu Lys Ile Thr Met Ser Arg Glu Leu Gly Gln Gly
            995             1000            1005

Ser Phe Gly Met Val Tyr Glu Gly Val Ala Lys Gly Val Val Lys
1010            1015            1020

Asp Glu Pro Glu Thr Arg Val Ala Ile Lys Thr Val Asn Glu Ala
1025            1030            1035

Ala Ser Met Arg Glu Arg Ile Glu Phe Leu Asn Glu Ala Ser Val
1040            1045            1050

Met Lys Glu Phe Asn Cys His His Val Val Arg Leu Leu Gly Val
1055            1060            1065

Val Ser Gln Gly Gln Pro Thr Leu Val Ile Met Glu Leu Met Thr
1070            1075            1080

Arg Gly Asp Leu Lys Ser Tyr Leu Arg Ser Leu Arg Pro Glu Met
1085            1090            1095

Glu Asn Asn Pro Val Leu Ala Pro Pro Ser Leu Ser Lys Met Ile
1100            1105            1110
```

-continued

```
Gln Met Ala Gly Glu Ile Ala Asp Gly Met Ala Tyr Leu Asn Ala
    1115            1120            1125

Asn Lys Phe Val His Arg Asp Leu Ala Ala Arg Asn Cys Met Val
    1130            1135            1140

Ala Glu Asp Phe Thr Val Lys Ile Gly Asp Phe Gly Met Thr Arg
    1145            1150            1155

Asp Ile Tyr Glu Thr Asp Tyr Tyr Arg Lys Gly Gly Lys Gly Leu
    1160            1165            1170

Leu Pro Val Arg Trp Met Ser Pro Glu Ser Leu Lys Asp Gly Val
    1175            1180            1185

Phe Thr Thr Tyr Ser Asp Val Trp Ser Phe Gly Val Val Leu Trp
    1190            1195            1200

Glu Ile Ala Thr Leu Ala Glu Gln Pro Tyr Gln Gly Leu Ser Asn
    1205            1210            1215

Glu Gln Val Leu Arg Phe Val Met Glu Gly Gly Leu Leu Asp Lys
    1220            1225            1230

Pro Asp Asn Cys Pro Asp Met Leu Phe Glu Leu Met Arg Met Cys
    1235            1240            1245

Trp Gln Tyr Asn Pro Lys Met Arg Pro Ser Phe Leu Glu Ile Ile
    1250            1255            1260

Ser Ser Ile Lys Glu Glu Met Glu Pro Gly Phe Arg Glu Val Ser
    1265            1270            1275

Phe Tyr Tyr Ser Glu Glu Asn Lys Leu Pro Glu Pro Glu Glu Leu
    1280            1285            1290

Asp Leu Glu Pro Glu Asn Met Glu Ser Val Pro Leu Asp Pro Ser
    1295            1300            1305

Ala Ser Ser Ser Ser Leu Pro Leu Pro Asp Arg His Ser Gly His
    1310            1315            1320

Lys Ala Glu Asn Gly Pro Gly Pro Gly Val Leu Val Leu Arg Ala
    1325            1330            1335

Ser Phe Asp Glu Arg Gln Pro Tyr Ala His Met Asn Gly Gly Arg
    1340            1345            1350

Lys Asn Glu Arg Ala Leu Pro Leu Pro Gln Ser Ser Thr Cys
    1355            1360            1365
```

P-ETHOXY NUCLEIC ACIDS FOR IGF-1R INHIBITION

CROSS REFERENCE TO RELATED APPLICATIONS

This application is a continuation of U.S. application Ser. No. 16/606,277 filed Oct. 18, 2019, which is a National Stage Entry of International Application No. PCT/US2018/028308 fled Apr. 19, 2018, which claims priority to U.S. Provisional Patent Application No. 62/487,425 filed Apr. 19, 2017, all of which are incorporated herein by reference in their entirety.

REFERENCE TO AN ELECTRONIC SEQUENCE LISTING

The present application contains a sequence listing submitted herewith, which a computer readable form (CRF) text file in compliance with 37 CFR 1.821. The contents of the electronic sequence listing (6107-191PCON_Sequence_Listing.txt, 42,500 bytes; and Date of Creation: Nov. 18, 2021) is herein incorporated by reference in its entirety.

BACKGROUND OF THE INVENTION

1. Field of the Invention

The present invention relates generally to the field of medicine. More particularly, it concerns liposomal formulations of P-ethoxy oligonucleotides that hybridize to a IGF-1R polynucleotide gene product and methods of making and using such formulations in medicine, even more particularly in the treatment of cancers that have high expression or increased activity of the IGF-1R gene.

2. Description of Related Art

The insulin-like growth factor 1 receptor (IGF-1R) is a glycoprotein receptor with tyrosine kinase activity. It is a hetero-tetrameric receptor of which each half—linked by disulfide bridges—is composed of an extracellular α-subunit and of a transmembrane β-subunit. IGF-1R binds IGF I and IGF II with a very high affinity. IGF-1R mediates mitogenic, differentiation, and antiapoptosis effects. The cytoplasmic tyrosine kinase proteins are activated by the binding of the ligand to the extracellular domain of the receptor. The activation of the kinases in its turn involves the stimulation of different intra-cellular substrates, including IRS-1, IRS-2, Shc and Grb 10.

The role of the IGF system in carcinogenesis has become the subject of intensive research. This interest followed the discovery of the fact that in addition to its mitogenic and antiapoptosis properties, IGF-1R seems to be required for the establishment and the maintenance of a transformed phenotype. In fact, it has been well established that an overexpression or a constitutive activation of IGF-1R leads, in a great variety of cells, to a growth of the cells independent of the support in media devoid of fetal calf serum, and to the formation of tumors in nude mice. IGF-1R is expressed in a great variety of tumors and of tumor lines and the IGFs amplify the tumor growth via their attachment to IGF-1R. Interestingly, murine monoclonal antibodies directed against IGF-1R inhibit the proliferation of numerous cell lines in culture and the growth of tumor cells in vivo (Arteaga et al., 1989; Li et al., 1993; Zia et al., 1996; Scotlandi et al., 1998). In addition, a negative dominant of IGF-1R is capable of inhibiting tumor proliferation (Jiang et al., 1999). Thus, IGF-1R plays important roles in carcinogenesis and tumor progression. As such, compositions and methods for effectively inhibiting IGF-1R expression are needed.

SUMMARY OF THE INVENTION

Provided herein are compositions for inhibiting IGF-1R expression using a non-toxic nuclease resistant oligonucleotide that targets IGF-1R-encoding polynucleotides in combination with a neutral liposome that prevents IGF-1R protein expression, thus eliminating the pool of available IGF-1R protein.

In one embodiment, compositions are provided comprising a population of oligonucleotides that hybridize to a IGF-1R polynucleotide gene product. In some aspects, the oligonucleotides of the population are composed of nucleoside molecules linked together through phosphate backbone linkages, wherein at least one of the phosphate backbone linkages in each oligonucleotide is a P-ethoxy backbone linkage, and wherein no more than 80% of the phosphate backbone linkages in each oligonucleotide are P-ethoxy backbone linkages. In some aspects, at least one of the phosphate backbone linkages in each oligonucleotide is a phosphodiester backbone linkage. In some aspects, the oligonucleotides of the population comprise a sequence according to any one of SEQ ID NOs: 1 or 2. In some aspects, the oligonucleotides of the population comprise a sequence according to SEQ ID NO: 1. In one aspect, the oligonucleotides of the population comprise a sequence according to SEQ ID NO: 1 and the phosphate backbone linkages at least between nucleotides 5 and 6, between nucleotides 11 and 12, and between nucleotides 16 and 17 of the oligonucleotides of the population are phosphodiester backbone linkages. In some aspects, the oligonucleotides of the population comprise a sequence according to SEQ ID NO: 2. In one aspect, the oligonucleotides of the population comprise a sequence according to SEQ ID NO: 2 and the phosphate backbone linkages at least between nucleotides 5 and 6, between nucleotides 11 and 12, and between nucleotides 17 and 18 of the oligonucleotides of the population are phosphodiester backbone linkages. In various aspects, the oligonucleotides of the population inhibit the expression of IGF-1R protein. In some aspects, the composition is lyophilized.

In some aspects, 10% to 80% of the phosphate backbone linkages are P-ethoxy backbone linkages; 20% to 80% of the phosphate backbone linkages are P-ethoxy backbone linkages; 30% to 80% of the phosphate backbone linkages are P-ethoxy backbone linkages; 40% to 80% of the phosphate backbone linkages are P-ethoxy backbone linkages; 50% to 80% of the phosphate backbone linkages are P-ethoxy backbone linkages; or 60% to 70% of the phosphate backbone linkages are P-ethoxy backbone linkages, or any range derivable therein. In some aspects, 20% to 90% of the phosphate backbone linkages are phosphodiester backbone linkages; 20% to 80% of the phosphate backbone linkages are phosphodiester backbone linkages; 20% to 70% of the phosphate backbone linkages are phosphodiester backbone linkages; 20% to 60% of the phosphate backbone linkages are phosphodiester backbone linkages; 20% to 50% of the phosphate backbone linkages are phosphodiester backbone linkages; or 30% to 40% of the phosphate backbone linkages are phosphodiester backbone linkages, or any range derivable therein. In various aspects, at least 5%, 10%, 15%, 20%, 25%, 30%, 35%, 40%, 45%, 50%, 55%, 60%, 65%, 60%, 65%, 70%, 75%, 80%, 85%, 90%, or 95%, or any value therein, of the phosphate backbone linkages are P-ethoxy backbone linkages. In various aspects, at most 5%, 10%, 15%, 20%, 25%, 30%, 35%, 40%, 45%, 50%, 55%, 60%, 65%, 70%, 75%, 80%, 85%, 90%, or 95%, or any value therein, of the phosphate backbone linkages are phosphodiester backbone linkages. In certain aspects, the phosphodiester backbone linkages are distributed throughout the oligonucleotides. As such, the oligonucleotides are not chimeric molecules. In some aspects, the oligonucleotides do not comprise a phosphorothioate backbone linkage.

In some aspects, the oligonucleotides of the population have a size ranging from 7 to 30 nucleotides. In certain aspects, the oligonucleotides of the population have a size ranging from 12 to 25 nucleotides. In various aspects, the oligonucleotides of the population have a size of at least 5, 6, 7, 8, 9, 10, 11, 12, 13, 14, 15, 16, 17, 18, 19, 20, 21, 22, 23, 24, 25, 26, 27, 28, 29, or 30 nucleotides. The size range may be an average size of the oligonucleotides in the population.

In some aspects, the oligonucleotides of the population have an average size of 7, 8, 9, 10, 11, 12, 13, 14, 15, 16, 17, 18, 19, 20, 21, 22, 23, 24, 25, 26, 27, 28, 29, or 30 nucleotides, wherein no more than 5, 6, 7, 8, 8, 9, 10, 11, 11, 12, 13, 14, 15, 15, 16, 17, 18, 19, 20, 20, 21, 22, 23, or 24, respectively, of the phosphate backbone linkages in each oligonucleotide is a P-ethoxy backbone linkage. In some aspects, the oligonucleotides of the population have an average size of 7, 8, 9, 10, 11, 12, 13, 14, 15, 16, 17, 18, 19, 20, 21, 22, 23, 24, 25, 26, 27, 28, 29, or 30 nucleotides and at least 2, 2, 2, 2, 3, 3, 3, 3, 4, 4, 4, 4, 4, 5, 5, 5, 5, 5, 6, 6, 6, 6, or 6, respectively, of the phosphate backbone linkages in each oligonucleotide is a phosphodiester backbone linkage. By way of example, the oligonucleotides of the population may have an average size of 18 nucleotides, wherein no more than 14 of the phosphate backbone linkages in each oligonucleotide is a P-ethoxy backbone linkage; the oligonucleotides of the population may have an average size of 20 nucleotides, wherein no more than 16 of the phosphate backbone linkages in each oligonucleotide is a P-ethoxy backbone linkage; the oligonucleotides of the population may have an average size of 25 nucleotides, wherein no more than 20 of the phosphate backbone linkages in each oligonucleotide is a P-ethoxy backbone linkage; or the oligonucleotides of the population may have an average size of 30 nucleotides, wherein no more than 24 of the phosphate backbone linkages in each oligonucleotide is a P-ethoxy backbone linkage.

In some aspects, the population of oligonucleotides comprises a single species of oligonucleotides. In other aspects, the population of oligonucleotides comprises at least two species of oligonucleotides. A single species of oligonucleotide may have the same nucleotide sequence but either have or lack P-ethoxy linkages in different positions within the molecule. As such, the population may be homogeneous as to the nucleotide sequence and heterogeneous as to the distribution of phosphodiester backbone linkages among the oligonucleotides of the population. In addition, the population may be heterogeneous as to the number of P-ethoxy backbone linkages and phosphodiester backbone linkages among the oligonucleotides of the population. As a non-limiting example, a first portion of the oligonucleotides of the population may have 70% P-ethoxy linkages and 30% phosphodiester linkages while a second portion of the oligonucleotides of the population may have 60% P-ethoxy linkages and 40% phosphodiester linkages. In some aspects, the population of oligonucleotides comprises antisense oligonucleotides, short interfering RNAs (siRNAs), microRNAs (miRNAs), or piwiRNAs (piRNAs).

In various aspects, the composition further comprises phospholipids. In some aspects, the phospholipids and oligonucleotides are present at a molar ratio of from about 5:1 to about 100:1. In some aspects, the oligonucleotides and phospholipids form an oligonucleotide-lipid complex, such as, for example, a liposome complex. In some aspects, at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% of the liposomes are less than 5 microns in diameter. In some aspects, at least 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% of the liposomes are less than 4 microns in diameter. In some aspects, the population of oligonucleotides are incorporated in the population of liposomes.

In some aspects, the phospholipids are uncharged or have a neutral charge at physiologic pH. In some aspects, the phospholipids are neutral phospholipids. In certain aspects, the neutral phospholipids are phosphatidylcholines. In certain aspects, the neutral phospholipids are dioleoylphosphatidyl choline. In some aspects, the phospholipids are essentially free of cholesterol.

In one embodiment, pharmaceutical compositions are provided comprising a composition of oligonucleotides and phospholipids of the present embodiments and a pharmaceutically acceptable carrier. In some aspects, the composition further comprises a chemotherapeutic agent.

In one embodiment, methods are provided for reducing the expression level of IGF-1R protein in a cell comprising contacting the cell with an oligonucleotide composition of the present embodiments. In some aspects, the expression of IGF-1R and genes downstream of IGF-1R, such as, for example, hexokinase, are downregulated in the cell. In some aspects, the cell is a mammalian cell. In some aspects, the cell is a cancer cell. In some aspects, the cell is a cell of the immune system, such as, for example, a monocyte, neutrophil, eosinophil, basophil, leukocyte, natural killer (NK) cell, lymphocyte, T cell, B cell, dendritic cell, mast cell, or macrophage. In certain aspects, the macrophage is a M2 macrophage, which produces higher levels of IGF-1R than a M1 macrophage and expresses one or more of CD11b, CD14, CD15, CD23, CD64, CD68, CD163, CD204, CD206 on its cell surface. In certain aspects, the monocyte is a M2 monocyte, which expresses one or more of CD11b, CD14, CD15, CD23, CD64, CD68, CD163, CD204, CD206 on its cell surface.

In one embodiment, methods are provided for delivering a therapeutically effective amount of an oligonucleotide to a cell comprising contacting the cell with a pharmaceutical composition of the present embodiments. In some aspects, the method is a method of treating hyperplasia, cancer, an autoimmune disease, or an infectious disease. In some aspects, the method is a method of treating, preventing, or delaying Alzheimer's disease, inflammatory bowel disease, insulin resistance in type 2 diabetes, and psoriasis. In one embodiment, methods are provided for enhancing an immune response induced by vaccination comprising administering to the subject a therapeutically effective amount of a pharmaceutical composition of the present embodiments.

In one embodiment, methods are provided for treating a subject with cancer, an autoimmune disease, or an infectious disease comprising administering to the subject a therapeutically effective amount of a pharmaceutical composition of the present embodiments. In some aspects, the subject is a human. In some aspects, the cancer is a bladder, blood, lymphoma, pancreas, bone, bone marrow, brain, breast, colon, esophagus, stomach, head and neck, kidney, liver, lung, prostate, skin, testis, tongue, ovary, or uterine cancer. Tumors treatable with the methods of the present invention include, but are not limited to, melanoma, prostate cancer, ovarian cancer, breast cancer, mammary cancer, head and neck squamous cell cancer, papillary renal cell carcinoma, gall bladder cancer, rectal cancer, pancreatic cancer, lung cancer, colon cancer, glioma, astrocytoma, classical Hodgkin's lymphoma, and smooth muscle tumors, as well as cells from glioblastoma, bone marrow stem cells, hematopoietic cells, osteoblasts, epithelial cells, fibroblasts, as well as any other tumor cells which undergo apoptosis and induce resistance to or regression of tumor cells. In some aspects, the autoimmune disease is a Th2 dominant autoimmune disease, which means that the autoimmune disease is driven by the activity of cells of the Th2 class of T helper cells. In some aspects, the autoimmune disease is Lupus erythematosis, allergic dermatitis, scleroderma, atopic eczema, sinusitis, inflammatory bowel disease, asthma, allergies, ulcerative colitis, multiple chemical sensitivity, Spondyloarthropathy, Sjogren's disease, Crohn's disease, diabetes mellitus, multiple sclerosis, or rheumatoid arthritis. In some aspects, the infectious disease is a bacterial infection, fungal infection, viral infection, or parasitic infection. In some aspects, the composition is administering subcutaneously, intravenously, or intraperitoneally. In some aspects, the method further comprises administering at least a second anticancer therapy to the subject. In some aspects, the second anticancer therapy is a surgical therapy, chemotherapy, radiation therapy, cryotherapy, hormone therapy, immunotherapy, or cytokine therapy. In some aspects, administration of the composition reduces expression of IGF-1R protein in the patient. In one embodiment, methods are provided for enhancing the immune response induced by vaccination.

In one embodiment, methods are provided for reducing the expression level of IGF-1R protein in a cell, comprising contacting the cell with a therapeutically effective amount of a pharmaceutical composition of the present embodiments comprising a composition comprising a population of oligonucleotides, wherein the oligonucleotides hybridize to an IGF-1R polynucleotide gene product, wherein oligonucleotides of the population are composed of nucleoside molecules linked together through phosphate backbone linkages, wherein at least one of the phosphate backbone linkages in each oligonucleotide is a P-ethoxy backbone linkage, and wherein no more than 80% of the phosphate backbone linkages in each oligonucleotide are P-ethoxy backbone linkages, phospholipids, and a pharmaceutically acceptable carrier, wherein the oligonucleotides and phospholipids form an oligonucleotide-lipid complex.

In one embodiment, methods are provided for delivering a therapeutically effective amount of an oligonucleotide to a cell comprising contacting the cell with a therapeutically effective amount of a pharmaceutical composition of the present embodiments comprising a composition comprising a population of oligonucleotides, wherein the oligonucleotides hybridize to an IGF-1R polynucleotide gene product, wherein oligonucleotides of the population are composed of nucleoside molecules linked together through phosphate backbone linkages, wherein at least one of the phosphate backbone linkages in each oligonucleotide is a P-ethoxy backbone linkage, and wherein no more than 80% of the phosphate backbone linkages in each oligonucleotide are P-ethoxy backbone linkages, phospholipids, and a pharmaceutically acceptable carrier, wherein the oligonucleotides and phospholipids form an oligonucleotide-lipid complex.

An oligonucleotide includes an antisense nucleic acid molecule that specifically hybridizes to a nucleic acid molecule encoding a target protein or regulating the expression of the target protein. "Specific hybridization" (or variations of these terms, including but not limited to "specifically hybridizes") means that the antisense nucleic acid molecule hybridizes to the targeted nucleic acid molecule and regulates its expression. Preferably, "specific hybridization" also means that no other genes or transcripts are affected. An oligonucleotide can be a single-stranded nucleic acid and may comprise 7, 8, 9, 10, 11, 12, 13, 14, 15, 16, 17, 18, 19, 20, 21, 22, 23, 24, 25, 26, 27, 28, 29, 30 or more nucleobases. In particular aspects the oligonucleotide can comprise 15 to 30, 19 to 25, 20 to 23, or 21 contiguous nucleobases. In certain embodiments, the oligonucleotide inhibits the translation of a gene that promotes growth of a cancerous or pre-cancerous or hyperplastic mammalian cell (e.g., a human cell). An oligonucleotide may induce apoptosis in the cell, and/or inhibit the translation of an oncogene or other target gene. In certain embodiments, the oligonucleotide component comprises a single species of oligonucleotide. In other embodiments, the oligonucleotide component comprises a 2, 3, 4 or more species of oligonucleotide that target 1, 2, 3, 4, or more genes. The composition may further comprise a chemotherapeutic or other anti-cancer agent, which may or may not be incorporated in a lipid component or liposome of the invention. In further embodiments, the oligonucleotide component is incorporated within the liposome or lipid component.

"Entrap," "encapsulate," and "incorporate" refer to the lipid or liposome forming an impediment to free diffusion into solution by an association with or around an agent of interest, e.g., a liposome may encapsulate an agent within a lipid layer or within an aqueous compartment inside or between lipid layers. In certain embodiments, the composition is comprised in a pharmaceutically acceptable carrier. The pharmaceutically acceptable carrier may be formulated for administration to a human subject or patient.

In certain embodiments, the lipid component has an essentially neutral charge because it comprises a neutral phospholipid or a net neutral charge. In certain aspects a neutral phospholipid may be a phosphatidylcholine, such as DOPC, egg phosphatidylcholine ("EPC"), dilauroylphosphatidylcholine ("DLPC"), dimyristoylphosphatidylcholine ("DMPC"), dipalmitoylphosphatidylcholine ("DPPC"), distearoylphosphatidylcholine ("DSPC"), dilinoleoylphosphatidylcholine, 1,2-diarachidoyl-sn-glycero-3-phosphocholine ("DAPC"), 1,2-dieicosenoyl-sn-glycero-3-phosphocholine ("DEPC"), 1-myristoyl-2-palmitoyl phosphatidylcholine ("MPPC"), 1-palmitoyl-2-myristoyl phosphatidylcholine ("PMPC"), 1-palmitoyl-2-stearoyl phosphatidylcholine ("PSPC"), 1-stearoyl-2-palmitoyl phosphatidylcholine ("SPPC"), 1-palmitoyl-2-oleoyl phosphatidylcholine ("POPC"), 1-oleoyl-2-palmitoyl phosphatidylcholine ("OPPC"), or lysophosphatidylcholine. In other aspects the neutral phospholipid can be a phosphatidylethanolamine, such as dioleoylphosphatidylethanolamine ("DOPE"), distearoylphophatidylethanolamine ("DSPE"), dimyristoyl phosphatidylethanolamine ("DMPE"), dipalmitoyl phosphatidylethanolamine ("DPPE"), palmitoyloleoyl phosphatidylethanolamine ("POPE"), or lysophosphatidylethanolamine. In certain embodiments, the phospholipid component can comprise 1, 2, 3, 4, 5, 6, 7, 8, or more kinds or types of neutral phospholipid. In other embodiments, a phospholipid component can comprise 2, 3, 4, 5, 6 or more kinds or type of neutral phospholipids.

In certain embodiments, a lipid component can have an essentially neutral charge because it comprises a positively charged lipid and a negatively charged lipid. The lipid component may further comprise a neutrally charged lipid(s) or phospholipid(s). The positively charged lipid may be a positively charged phospholipid. The negatively charged lipid may be a negatively charged phospholipid. The negatively charged phospholipid may be a phosphatidylserine, such as dimyristoyl phosphatidylserine ("DMPS"), dipalmitoyl phosphatidylserine ("DPPS"), or brain phosphatidylserine ("BPS"). The negatively charged phospholipid may be a phosphatidylglycerol, such as dilauroylphosphatidylglycerol ("DLPG"), dimyristoylphosphatidylglycerol ("DMPG"), dipalmitoylphosphatidylglycerol ("DPPG"), distearoylphosphatidylglycerol ("DSPG"), or dioleoylphosphatidylglycerol ("DOPG"). In certain embodiments, the composition further comprises cholesterol or polyethyleneglycol (PEG). In other embodiments, the composition is essentially free of cholesterol. In certain embodiments, a phospholipid is a naturally-occurring phospholipid. In other embodiments, a phospholipid is a synthetic phospholipid.

Liposomes can be made of one or more phospholipids, as long as the lipid material is substantially uncharged. It is important that the composition be substantially free of anionic and cationic phospholipids and cholesterol. Suitable phospholipids include phosphatidylcholines and others that are well known to persons that are skilled in this field.

Another aspect of the present invention involves methods for delivering oligonucleotide to a cell comprising contacting the cell with a neutral lipid composition of the invention. The methods will provide an inventive composition in an effective amount. An effective amount is an amount of therapeutic component that attenuates, slows, reduces or eliminates a cell, condition, or disease state in a subject. The cell may be comprised in a subject or patient, such as a human. The method may further comprise a method of treating cancer or other hyperplastic condition. The cancer may have originated in the bladder, blood, bone, bone marrow, brain, breast, colon, esophagus, gastrointestine, gum, head, kidney, liver, lymph node, lung, nasopharynx, neck, prostate, skin, stomach, testis, tongue, ovary, or uterus. In certain embodiments, the method further comprises a method of treating a non-cancerous disease or hyperplastic condition. The cell may be a pre-cancerous or a cancerous cell. In certain embodiments, the compositions and methods inhibit the growth of the cell, induce apoptosis in the cell, and/or inhibit the translation of an oncogene. The oligonucleotide may inhibit the translation of a gene that is overexpressed in the cancerous cell.

In certain embodiments, the methods of the invention further comprise administering an additional therapy to the subject. The additional therapy may comprise administering a chemotherapeutic (e.g., paclitaxel or docetaxel), a surgery, a radiation therapy, and/or a gene therapy. In certain aspects the chemotherapy is docetaxel, paclitaxel, cisplatin (CDDP), carboplatin, procarbazine, mechlorethamine, cyclophosphamide, camptothecin, ifosfamide, melphalan, chlorambucil, busulfan, nitrosurea, dactinomycin, daunorubicin, doxorubicin, bleomycin, plicomycin, mitomycin, etoposide (VP16), tamoxifen, raloxifene, estrogen receptor binding agents, taxol, gemcitabien, navelbine, farnesyl-protein tansferase inhibitors, transplatinum, 5-fluorouracil, vincristin, vinblastin, methotrexate, or combinations thereof. In certain embodiments the chemotherapy is a taxane such as docetaxal or paclitaxel. The chemotherapy can be delivered before, during, after, or combinations thereof relative to a neutral lipid composition of the invention. A chemotherapy can be delivered within 0, 1, 5, 10, 12, 20, 24, 30, 48, or 72 hours or more of the neutral lipid composition. The neutral lipid composition, the second anti-cancer therapy, or both the neutral lipid composition and the anti-cancer therapy can be administered intratumorally, intravenously, intraperitoneally, subcutaneously, orally or by various combinations thereof.

It is contemplated that any embodiment discussed in this specification can be implemented with respect to any method or composition of the invention, and vice versa. Furthermore, compositions of the invention can be used to achieve the methods of the invention.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

Throughout this application, the term "about" is used to indicate that a value includes the inherent variation of error for the device, the method being employed to determine the value, or the variation that exists among the study subjects.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1—Liposomal IGF-1R antisense delays the formation of GL261 cell tumors in mice. The ability of liposomal IGF-1R antisense to prevent growth of GL261 cell tumors implanted in mice was tested by administering liposomal IGF-1R antisense corresponding to SEQ ID NO: 1 to mice 14 days after implantation of GL261 cells.

DESCRIPTION OF ILLUSTRATIVE EMBODIMENTS

To inhibit the expression of IGF-1R protein, the present invention provides compositions and methods for delivery of an anti-IGF-1R oligonucleotide (e.g., an inhibitor of gene expression) to a cell via a lipid composition, in certain aspects a lipid composition with a net charge of about zero, i.e., a neutral lipid composition, which allows it to be delivered systemically via intravenous infusion. These methods may be effectively used to treat a cancer, treat an autoimmune disease, or enhance an immune response induced by vaccination.

I. LIPIDS AND LIPOSOMES

"Liposomes" is used herein to mean lipid-containing vesicles having a lipid bilayer, as well as other lipid carrier particles that can entrap or incorporate antisense oligonucleotides. As such, liposome is a generic term encompassing a variety of unilamellar, multilamellar, and multivesicular lipid vehicles formed by the generation of enclosed lipid bilayers or aggregates. In addition, liposomes may have an undefined lamellar structure. Liposomes may be characterized as having vesicular structures with a phospholipid bilayer membrane and an inner aqueous medium. Multilamellar liposomes have multiple lipid layers separated by aqueous medium. They form spontaneously when phospholipids are suspended in an excess of aqueous solution. The lipid components undergo self-rearrangement before the formation of closed structures and entrap water and dissolved solutes between the lipid bilayers (Ghosh and Bachhawat, 1991). However, the present invention also encompasses compositions that have different structures in solution than the normal vesicular structure. For example, the lipids may assume a micellar structure or merely exist as non-uniform aggregates of lipid molecules.

Liposomes are a form of nanoparticles that are carriers for delivering a variety of drugs into a diseased tissue. Optimal liposome size depends on the target tissue. In tumor tissue, the vasculature is discontinuous, and pore sizes vary from 100 to 780 nm (Siwak et al., 2002). By comparison, pore size in normal vascular endothelium is <2 nm in most tissues, and 6 nm in post-capillary venules. Negatively charged liposomes are thought to be more rapidly removed from circulation than neutral or positively charged liposomes; however, recent studies have indicated that the type of negatively charged lipid affects the rate of liposome uptake by the reticulo-endothelial system (RES). For example, liposomes containing negatively charged lipids that are not sterically shielded (phosphatidylserine, phosphatidic acid, and phosphatidylglycerol) are cleared more rapidly than neutral liposomes. Interestingly, cationic liposomes (1,2-dioleoyl-3-trimethylammonium-propane [DOTAP]) and cationic-liposome-DNA complexes are more avidly bound and internalized by endothelial cells of angiogenic blood vessels via endocytosis than anionic, neutral, or sterically stabilized neutral liposomes (Thurston et al., 1998; Krasnici et al., 2003). Cationic liposomes may not be ideal delivery vehicles for tumor cells because surface interactions with the tumor cells create an electrostatically derived binding-site barrier effect, inhibiting further association of the delivery systems with tumor spheroids (Kostarelos et al., 2004). However, neutral liposomes appear to have better intratumoral penetration. Toxicity with specific liposomal preparations has also been a concern. Cationic liposomes elicit dose-dependent toxicity and pulmonary inflammation by promoting release of reactive oxygen intermediates, and this effect is more pronounced with multivalent cationic liposomes than monovalent cationic liposomes, such as DOTAP (Dokka et al., 2000). Neutral and negative liposomes do not appear to exhibit lung toxicity (Guitierrez-Puente et al., 1999). Cationic liposomes, while efficiently taking up nucleic acids, have had limited success for in vivo gene down-regulation, perhaps because of their stable intracellular nature and resultant failure to release nucleic acid contents. Lipids with neutral charge or lipid compositions with a neutralized charge, e.g., 1,2-dioleoyl-sn-glycero-3-phosphocholine (DOPC), are used herein because of the neutral properties and success in delivering antisense oligonucleotides in vivo.

The present invention provides methods and compositions for associating an oligonucleotide, such as an antisense oligonucleotide, with a lipid and/or liposome. The oligonucleotide may be incorporated in the aqueous interior of a liposome, interspersed within the lipid bilayer of a liposome, attached to a liposome via a linking molecule that is associated with both the liposome and the oligonucleotide, entrapped in a liposome, complexed with a liposome, dispersed in a solution containing a lipid, mixed with a lipid, combined with a lipid, contained as a suspension in a lipid, contained or complexed with a micelle, or otherwise associated with a lipid. The liposome or liposome/oligonucleotide-associated compositions provided herein are not limited to any particular structure in solution. For example, they may be present in a bilayer structure, as micelles, or with a "collapsed" structure. They may also simply be interspersed in a solution, possibly forming aggregates that are not uniform in either size or shape.

A. Lipids

Lipids are fatty substances that may be naturally occurring or synthetic. For example, lipids include the fatty droplets that naturally occur in the cytoplasm as well as the class of compounds that are well known to those of skill in the art that contain long-chain aliphatic hydrocarbons and their derivatives, such as fatty acids, alcohols, amines, amino alcohols, and aldehydes. An example is the lipid 1,2-dioleoyl-sn-glycero-3-phosphocholine (DOPC).

Lipid compositions of the present invention may comprise phospholipids. In certain embodiments, a single kind or type of phospholipid may be used in the creation of lipid compositions, such as liposomes. In other embodiments, more than one kind or type of phospholipid may be used.

Phospholipids include glycerophospholipids and certain sphingolipids. Phospholipids include, but are not limited to, dioleoylphosphatidylycholine ("DOPC"), egg phosphatidylcholine ("EPC"), dilauryloylphosphatidylcholine ("DLPC"), dimyristoylphosphatidylcholine ("DMPC"), dipalmitoylphosphatidylcholine ("DPPC"), distearoylphosphatidylcholine ("DSPC"), dilinoleoylphosphatidylcholine, 1,2-diarachidoyl-sn-glycero-3-phosphocholine ("DAPC"), 1,2-dieicosenoyl-sn-glycero-3-phosphocholine ("DEPC"), 1-myristoyl-2-palmitoyl phosphatidylcholine ("MPPC"), 1-palmitoyl-2-myristoyl phosphatidylcholine ("PMPC"), 1-palmitoyl-2-stearoyl phosphatidylcholine ("PSPC"), 1-stearoyl-2-palmitoyl phosphatidylcholine ("SPPC"), palmitoyloeoyl phosphatidylcholine ("POPC"), 1-oleoyl-2-palmitoyl phosphatidylcholine ("OPPC"), dilauryloylphosphatidylglycerol ("DLPG"), dimyristoylphosphatidylglycerol ("DMPG"), dipalmitoylphosphatidylglycerol ("DPPG"), distearoylphosphatidylglycerol ("DSPG"), dioleoylphosphatidylglycerol ("DOPG"), dimyristoyl phosphatidic acid ("DMPA"), dipalmitoyl phosphatidic acid ("DPPA"), distearoyl phosphatidic acid ("DSPA"), dioleoyl phosphatidic acid ("DOPA"), dimyristoyl phosphatidylethanolamine ("DMPE"), dipalmitoyl phosphatidylethanolamine ("DPPE"), distearoylphophatidylethanolamine ("DSPE"), dioleoylphosphatidylethanolamine ("DOPE"), palmitoyloeoyl phosphatidyletlianolamine ("POPE"), dimyristoyl phosphatidylserine ("DMPS"), dipalmitoyl phosphatidylserine ("DPPS"), brain phosphatidylserine ("BPS"), distearoyl sphingomyelin ("DSSP"), brain sphingomyelin ("BSP"), dipalmitoyl sphingomyelin ("DPSP"), lysophosphatidylcholine, and lysophosphatidylethanolamine.

Phospholipids include, for example, phosphatidylcholines, phosphatidylglycerols, and phosphatidylethanolamines; because phosphatidylethanolamines and phosphatidylcholines are non-charged under physiological conditions (i.e., at about pH 7), these compounds may be particularly useful for generating neutral liposomes. In certain embodiments, the phospholipid DOPC is used to produce non-charged liposomes or lipid compositions. In certain embodiments, a lipid that is not a phospholipid (e.g., a cholesterol) can also be used Phospholipids may be from natural or synthetic sources. However, phospholipids from natural sources, such as egg or soybean phosphatidylcholine, brain phosphatidic acid, brain or plant phosphatidylinositol, heart cardiolipin, and plant or bacterial phosphatidylethanolamine, are not used in certain embodiments as the primary phosphatide (i.e., constituting 50% or more of the total phosphatide composition) because this may result in instability and leakiness of the resulting liposomes.

B. Neutral Liposomes

"Neutral liposomes or lipid composition" or "non-charged liposomes or lipid composition," as used herein, are defined as liposomes or lipid compositions having one or more lipids that yield an essentially-neutral net charge (substantially non-charged). In certain embodiments, neutral liposomes or lipid compositions may include mostly lipids and/or phospholipids that are themselves neutral. In certain embodiments, amphipathic lipids may be incorporated into or used to generate neutral liposomes or lipid compositions. For example, a neutral liposome may be generated by combining positively and negatively charged lipids so that those charges substantially cancel one another, thereby yielding an essentially-neutral net charge. By "essentially neutral" or "essentially non-charged," it is meant that few, if any, lipids within a given population (e.g., a population of liposomes) include a charge that is not canceled by an opposite charge of another component (e.g., fewer than 10% of components include a non-canceled charge, more preferably fewer than 5%, and most preferably fewer than 1%). In certain embodiments of the present invention, a composition may be prepared wherein the lipid component of the composition is essentially neutral but is not in the form of liposomes.

The size of the liposomes varies depending on the method of synthesis. A liposome suspended in an aqueous solution is generally in the shape of a spherical vesicle, and may have one or more concentric layers of lipid bilayer molecules. Each layer consists of a parallel array of molecules represented by the formula XY, wherein X is a hydrophilic moiety and Y is a hydrophobic moiety. In aqueous suspension, the concentric layers are arranged such that the hydrophilic moieties tend to remain in contact with an aqueous phase and the hydrophobic regions tend to self-associate. For example, when aqueous phases are present within the liposome, the lipid molecules may form a bilayer, known as a lamella, of the arrangement XY-YX. Aggregates of lipids may form when the hydrophilic and hydrophobic parts of more than one lipid molecule become associated with each other. The size and shape of these aggregates will depend upon many different variables, such as the nature of the solvent and the presence of other compounds in the solution.

Liposomes within the scope of the present invention can be prepared in accordance with known laboratory techniques, such as, for example, the method of Bangham et al. (1965), the contents of which are incorporated herein by reference; the method of Gregoriadis (1979), the contents of which are incorporated herein by reference; the method of Deamer and Uster (1983), the contents of which are incorporated by reference; and the reverse-phase evaporation method as described by Szoka and Papahadjopoulos (1978). The aforementioned methods differ in their respective abilities to entrap aqueous material and their respective aqueous space-to-lipid ratios.

In certain embodiments, a neutral liposome may be used to deliver an oligonucleotide, such as an antisense oligonucleotide. The neutral liposome may contain a single species of oligonucleotide directed to the suppression of translation of a single gene, or the neutral liposome may contain multiple species of oligonucleotides that are directed to the suppression of translation of multiple genes. Further, the neutral liposome may also contain a chemotherapeutic in addition to the oligonucleotide; thus, in certain embodiments, a chemotherapeutic and an oligonucleotide may be delivered to a cell (e.g., a cancerous cell in a human subject) in the same or separate compositions.

Dried lipids or lyophilized liposomes may be dehydrated and reconstituted at an appropriate concentration with a suitable solvent (e.g., DPBS or Hepes buffer). The mixture may then be vigorously shaken in a vortex mixer. The liposomes may be resuspended at an appropriate total phospholipid concentration (e.g., about 10-200 mM). Unencapsulated oligonucleotide may be removed by centrifugation at 29,000 g and the liposomal pellets washed. Alternatively, the unencapsulated oligonucleotides may be removed by dialyzing against an excess of solvent. The amount of oligonucleotide encapsulated can be determined in accordance with standard methods.

II. INHIBITION OF GENE EXPRESSION

An inhibitory oligonucleotide can inhibit the transcription or translation of a gene in a cell. An oligonucleotide may be from 5 to 50 or more nucleotides long, and in certain embodiments from 7 to 30 nucleotides long. In certain embodiments, the oligonucleotide maybe 7, 8, 9, 10, 11, 12, 13, 14, 15, 16, 17, 18, 19, 20, 21, 22, 23, 24, 25, 26, 27, 28, 29, or 30 nucleotides long. The oligonucleotide may comprise a nucleic acid and/or a nucleic acid analog. Typically, an inhibitory oligonucleotide will inhibit the translation of a single gene within a cell; however, in certain embodiments, an inhibitory oligonucleotide may inhibit the translation of more than one gene within a cell.

Within an oligonucleotide, the components of the oligonucleotide need not be of the same type or homogenous throughout (e.g., an oligonucleotide may comprise a nucleotide and a nucleic acid or nucleotide analog). In certain embodiments of the present invention, the oligonucleotide may comprise only a single nucleic acid or nucleic acid analog. The inhibitory oligonucleotide may comprise 5, 6, 7, 8, 9, 10, 11, 12, 13, 14, 15, 16, 17, 18, 19, 20, 25, 30 or more contiguous nucleobases, including all ranges therebetween, that hybridize with a complementary nucleic acid to form a double-stranded structure.

III. NUCLEIC ACIDS

The present invention provides methods and compositions for the delivery of an oligonucleotide via neutral liposomes. Because an oligonucleotide is composed of a nucleic acid, methods relating to nucleic acids (e.g., production of a nucleic acid, modification of a nucleic acid, etc.) may also be used with regard to an oligonucleotide.

The term "nucleic acid" is well known in the art. A "nucleic acid" as used herein generally refers to a molecule (i.e., a strand) of DNA, RNA, or a derivative or analog thereof, comprising a nucleobase. These definitions refer to a single-stranded or double-stranded nucleic acid. Double-stranded nucleic acids may be formed by fully complementary binding; however, in some embodiments, a double-stranded nucleic acid may be formed by partial or substantial complementary binding. As used herein, a single-stranded nucleic acid may be denoted by the prefix "ss" and a double-stranded nucleic acid by the prefix "ds."

A. Nucleobases

As used herein a "nucleobase" refers to a heterocyclic base, such as, for example, a naturally occurring nucleobase (i.e., an A, T, G, C or U) found in at least one naturally occurring nucleic acid (i.e., DNA and RNA), and naturally or non-naturally occurring derivative(s) and analogs of such a nucleobase. A nucleobase generally can form one or more hydrogen bonds (i.e., "anneal" or "hybridize") with at least one naturally occurring nucleobase in a manner that may substitute for naturally occurring nucleobase pairing (e.g., the hydrogen bonding between A and T, G and C, and A and U). A nucleobase may be comprised in a nucleoside or nucleotide, using any chemical or natural synthesis method described herein or known to one of ordinary skill in the art.

"Purine" and/or "pyrimidine" nucleobase(s) encompass naturally occurring purine and/or pyrimidine nucleobases and also derivative(s) and analog(s) thereof, including but not limited to, a purine or pyrimidine substituted by one or more of an alkyl, carboxyalkyl, amino, hydroxyl, halogen (i.e., fluoro, chloro, bromo, or iodo), thiol, or alkylthiol moiety. Preferred alkyl (e.g., alkyl, caboxyalkyl, etc.) moieties comprise of from about 1, about 2, about 3, about 4, about 5, to about 6 carbon atoms. Other non-limiting examples of a purine or pyrimidine include a deazapurine, a 2,6-diaminopurine, a 5-fluorouracil, a xanthine, a hypoxanthine, a 8-bromoguanine, a 8-chloroguanine, a bromothyline, a 8-aminoguanine, a 8-hydroxyguanine, a 8-methylguanine, a 8-thioguanine, an azaguanine, a 2-aminopurine, a 5-ethylcytosine, a 5-methylcyosine, a 5-bromouracil, a 5-ethyluracil, a 5-iodouracil, a 5-chlorouracil, a 5-propyluracil, a thiouracil, a 2-methyladenine, a methylthioadenine, a N,N-diemethyladenine, an azaadenines, a 8-bromoadenine, a 8-hydroxyadenine, a 6-hydroxyaminopurine, a 6-thiopurine, a 4-(6-aminohexyl/cytosine), and the like. Purine and pyrimidine derivatives or analogs include, but are not limited to (abbreviation/modified base description): ac4c/4-acetylcytidine, Mam5s2u/5-methoxyaminomethyl-2-thiouridine, Chm5u/5-(carboxyhydroxylmethyl) uridine, Man q/Beta, D-mannosylqueosine, Cm/2'-O-methylcytidine, Mcm5s2u/5-methoxycarbonylmethyl-2-thiouridine, Cmnm5s2u/5-carboxymethylamino-methyl-2-thioridine, Mcm5u/5-methoxycarbonylmethyluridine, Cmnm5u/5-carboxymethylaminomethyluridine, Mo5u/5-methoxyuridine, D/Dihydrouridine, Ms2i6a, 2-methylthio-N6-isopentenyladenosine, Fm/2'-O-methylpseudouridine, Ms2t6a/N-((9-beta-D-ribofuranosyl-2-methylthiopurine-6-yl)carbamoyl)threonine, Gal q/Beta,D-galactosylqueosine, Mt6a/N-((9-beta-D-ribofuranosylpurine-6-yl)N-methyl-carbamoyl) threonine, Gm/2'-O-methylguanosine, Mv/Uridine-5-oxyacetic acid methylester, I/Inosine, o5u/Uridine-5-oxyacetic acid (v), I6a/N6-isopentenyladenosine, Osyw/Wybutoxosine, m1a/1-methyladenosine, P/Pseudouridine, m1f/i-methylpseudouridine, Q/Queosine, m1g/1-methylguanosine, s2c/2-thiocytidine, m1I/1-methylinosine, s2t/5-methyl-2-thiouridine, m22g/2,2-dimethylguanosine, s2u/2-thiouridine, m2a/2-methyladenosine, s4u/4-thiouridine, m2g/2-methylguanosine, T/5-methyluridine, m3c/3-methylcytidine, t6a/N-((9-beta-D-ribofuranosylpurine-6-yl)carbamoyl)threonine, m5c/5-methylcytidine, Tm/2'-O-methyl-5-methyluridine, m6a/N6-methyladenosine, Um/2'-O-methyluridine, m7g/7-methylguanosine, Yw/Wybutosine, Mam5u/5-methylaminomethyluridine, or X/3-(3-amino-3-carboxypropyl)uridine, (acp3)u.

B. Nucleosides

As used herein, a "nucleoside" refers to an individual chemical unit comprising a nucleobase covalently attached to a nucleobase linker moiety. A non-limiting example of a "nucleobase linker moiety" is a sugar comprising 5-carbon atoms (i.e., a "5-carbon sugar"), including but not limited to a deoxyribose, a ribose, an arabinose, or a derivative or an analog of a 5-carbon sugar. Non-limiting examples of a derivative or an analog of a 5-carbon sugar include a 2'-fluoro-2'-deoxyribose or a carbocyclic sugar where a carbon is substituted for an oxygen atom, in the sugar ring. As used herein, a "moiety" generally refers to a smaller chemical or molecular component of a larger chemical or molecular structure.

Different types of covalent attachment(s) of a nucleobase to a nucleobase linker moiety are known in the art. By way of non-limiting example, a nucleoside comprising a purine (i.e., A or G) or a 7-deazapurine nucleobase typically comprises a covalent attachment of the 9 position of the purine or 7-deazapurine to a 1'-position of a 5-carbon sugar. In another non-limiting example, a nucleoside comprising a pyrimidine nucleobase (i.e., C, T, or U) typically comprises a covalent attachment of the 1 position of the pyrimidine to a 1'-position of a 5-carbon sugar (Kornberg and Baker, 1992).

C. Nucleotides

As used herein, a "nucleotide" refers to a nucleoside further comprising a "backbone linkage." A backbone linkage generally covalently attaches a nucleotide to another molecule comprising a nucleotide, or to another nucleotide to form a nucleic acid. The "backbone linkage" in naturally occurring nucleotides typically comprises a phosphate moiety (e.g., a phosphodiester backbone linkage), which is covalently attached to a 5-carbon sugar. The attachment of the backbone moiety typically occurs at either the 3'- or 5'-position of the 5-carbon sugar. However, other types of attachments are known in the art, particularly when a nucleotide comprises derivatives or analogs of a naturally occurring 5-carbon sugar or phosphate moiety.

D. Nucleic Acid Analogs

A nucleic acid may comprise, or be composed entirely of, a derivative or analog of a nucleobase, a nucleobase linker moiety, and/or backbone linkage that may be present in a naturally occurring nucleic acid. As used herein a "derivative" refers to a chemically modified or altered form of a naturally occurring molecule, while the terms "mimic" or "analog" refer to a molecule that may or may not structurally resemble a naturally occurring molecule or moiety, but possesses similar functions. Nucleobase, nucleoside, and nucleotide analogs or derivatives are well known in the art.

Non-limiting examples of nucleosides, nucleotides, or nucleic acids comprising 5-carbon sugar and/or backbone linkage derivatives or analogs, include those in U.S. Pat. No. 5,681,947 which describes oligonucleotides comprising purine derivatives that form triple helixes with and/or prevent expression of dsDNA; U.S. Pat. Nos. 5,652,099 and 5,763,167 which describe nucleic acids incorporating fluorescent analogs of nucleosides found in DNA or RNA, particularly for use as fluorescent nucleic acids probes; U.S. Pat. No. 5,614,617 which describes oligonucleotide analogs with substitutions on pyrimidine rings that possess enhanced nuclease stability; U.S. Pat. Nos. 5,670,663, 5,872,232 and 5,859,221 which describe oligonucleotide analogs with modified 5-carbon sugars (i.e., modified 2'-deoxyfuranosyl moieties) used in nucleic acid detection; U.S. Pat. No. 5,446,137 which describes oligonucleotides comprising at least one 5-carbon sugar moiety substituted at the 4' position with a substituent other than hydrogen that can be used in hybridization assays; U.S. Pat. No. 5,886,165 which describes oligonucleotides with both deoxyribonucleotides with 3'-5' backbone linkages and ribonucleotides with 2'-5' backbone linkages; U.S. Pat. No. 5,714,606 which describes a modified backbone linkage wherein a 3'-position oxygen of the backbone linkage is replaced by a carbon to enhance the nuclease resistance of nucleic acids; U.S. Pat. No. 5,672,697 which describes oligonucleotides containing one or more 5' methylene phosphonate backbone linkages that enhance nuclease resistance; U.S. Pat. Nos. 5,466,786 and 5,792,847 which describe the linkage of a substituent moiety that may comprise a drug or label to the 2' carbon of an oligonucleotide to provide enhanced nuclease stability and ability to deliver drugs or detection moieties; U.S. Pat. No. 5,223,618 which describes oligonucleotide analogs with a 2 or 3 carbon backbone linkage attaching the 4' position and 3' position of adjacent 5-carbon sugar moiety to enhanced cellular uptake, resistance to nucleases, and hybridization to target RNA; U.S. Pat. No. 5,470,967 which describes oligonucleotides comprising at least one sulfamate or sulfamide backbone linkage that are useful as nucleic acid hybridization probes; U.S. Pat. Nos. 5,378,825, 5,777,092, 5,623,070, 5,610,289 and 5,602,240 which describe oligonucleotides with a three or four atom backbone linkage moiety replacing the phosphodiester backbone linkage used for improved nuclease resistance, cellular uptake, and regulating RNA expression; U.S. Pat. No. 5,858,988 which describes hydrophobic carrier agent attached to the 2'-O position of oligonucleotides to enhance their membrane permeability and stability; U.S. Pat. No. 5,214,136 which describes oligonucleotides conjugated to anthraquinone at the 5' terminus that possess enhanced hybridization to DNA or RNA; enhanced stability to nucleases; U.S. Pat. No. 5,700,922 which describes PNA-DNA-PNA chimeras wherein the DNA comprises 2'-deoxy-erythro-pentofaranosyl nucleotides for enhanced nuclease resistance, binding affinity, and ability to activate RNase H; U.S. Pat. No. 5,708,154 which describes RNA linked to a DNA to form a DNA-RNA hybrid; U.S. Pat. No. 5,908,845 which describes polyether nucleic acids wherein one or more nucleobases are linked to chiral carbon atoms in a polyether backbone; U.S. Pat. Nos. 5,786,461, 5,891,625, 5,786,461, 5,773,571, 5,766,855, 5,736,336, 5,719,262, 5,714,331, 5,539,082, and WO 92/20702 which describe peptide nucleic acids (PNA or peptide-based nucleic acid analog; or PENAM) that generally comprise one or more nucleotides or nucleosides that comprise a nucleobase moiety, a nucleobase linker moiety that is not a 5-carbon sugar (e.g., aza nitrogen atoms, amido and/or ureido tethers), and/or a backbone linkage that is not a phosphate backbone linkage (e.g., aminoethylglycine, polyamide, polyethyl, polythioamide, polysulfinamide, or polysulfonamide backbone linkage); and U.S. Pat. No. 5,855,911 which describes the hydrophobic, nuclease resistant P-ethoxy backbone linkage.

Other modifications and uses of nucleic acid analogs are known in the art, and it is anticipated that these techniques and types of nucleic acid analogs may be used with the present invention.

E. Preparation of Nucleic Acids

A nucleic acid may be made by any technique known to one of ordinary skill in the art, such as chemical synthesis, enzymatic production or biological production. Non-limiting examples of a synthetic nucleic acid (e.g., a synthetic oligonucleotide) include a nucleic acid made by in vitro chemical synthesis using phosphotriester, phosphite, or phosphoramidite chemistry and solid phase techniques, such as described in EP 266,032, incorporated herein by reference, or by deoxynucleoside H-phosphonate intermediates as described by Froehler et al. (1986) and U.S. Pat. No. 5,705,629, each incorporated herein by reference. In the methods of the present invention, one or more species of oligonucleotide may be used. Various mechanisms of oligonucleotide synthesis have been disclosed in, for example, U.S. Pat. Nos. 4,659,774, 4,816,571, 5,141,813, 5,264,566, 4,959,463, 5,428,148, 5,554,744, 5,574,146, 5,602,244, each of which is incorporated herein by reference.

F. Purification of Nucleic Acids

A nucleic acid may be purified on polyacrylamide gels, cesium chloride centrifugation gradients, or by any other means known to one of ordinary skill in the art (see for example, Sambrook et al. (2001), incorporated herein by reference).

In certain embodiments, the present invention concerns a nucleic acid that is an isolated nucleic acid. As used herein, the term "isolated nucleic acid" refers to a nucleic acid molecule (e.g., an RNA or DNA molecule) that has been isolated free of, or is otherwise free of, the bulk of the total genomic and transcribed nucleic acids of one or more cells. In certain embodiments, "isolated nucleic acid" refers to a nucleic acid that has been isolated free of, or is otherwise free of, the bulk of cellular components or in vitro reaction components, such as, for example, macromolecules, such as lipids or proteins, small biological molecules, and the like.

G. Hybridization

As used herein, "hybridization," "hybridize(s)," or "capable of hybridizing" is understood to mean the forming of a double or triple stranded molecule or a molecule with partial double or triple stranded nature. The term "anneal" as used herein is synonymous with "hybridize."

As used herein "stringent condition(s)" or "high stringency" are those conditions that allow hybridization between or within one or more nucleic acid strand(s) containing complementary sequence(s), but precludes hybridization of random sequences. Stringent conditions tolerate little, if any, mismatch between a nucleic acid and a target strand. Such conditions are well known to those of ordinary skill in the art, and are preferred for applications requiring high selectivity.

Stringent conditions may comprise low salt and/or high temperature conditions, such as provided by about 0.02 M to about 0.15 M NaCl at temperatures of about 50° C. to about 70° C. It is understood that the temperature and ionic strength of a desired stringency are determined in part by the length of the particular nucleic acid(s), the length and nucleobase content of the target sequence(s), the charge composition of the nucleic acid(s), and to the presence or concentration of formamide, tetramethylammonium chloride, or other solvent(s) in a hybridization mixture.

It is also understood that these ranges, compositions and conditions for hybridization are mentioned by way of non-limiting examples only, and that the desired stringency for a particular hybridization reaction is often determined empirically by comparison to one or more positive or negative controls. Depending on the application envisioned it is preferred to employ varying conditions of hybridization to achieve varying degrees of selectivity of a nucleic acid towards a target sequence. In a non-limiting example, identification or isolation of a related target nucleic acid that does not hybridize to a nucleic acid under stringent conditions may be achieved by hybridization at low temperature and/or high ionic strength. Such conditions are termed "low stringency" or "low stringency conditions," and non-limiting examples of low stringency include hybridization performed at about 0.15 M to about 0.9 M NaCl at a temperature range of about 20° C. to about 50° C. Of course, it is within the skill of one in the art to further modify the low or high stringency conditions to suit a particular application.

IV. METHOD OF MANUFACTURING LIPOSOMAL P-ETHOXY ANTISENSE DRUG PRODUCT

Antisense oligonucleotides (oligos) complementary to specific regions of a target mRNA have been used to inhibit the expression of endogenous genes. When the antisense oligonucleotides bind to a target mRNA, a DNA-RNA hybrid is formed. This hybrid formation inhibits the translation of the mRNA and, thus, the expression of the encoded protein. If the protein is essential for the survival of the cell, the inhibition of its expression may lead to cell death. Therefore, antisense oligonucleotides can be useful tools in anticancer and antiviral therapies.

The main obstacles in using antisense oligonucleotides to inhibit gene expression are cellular instability, low cellular uptake, and poor intercellular delivery. Natural phosphodiesters are not resistant to nuclease hydrolysis; thus high concentrations of antisense oligonucleotides are needed before any inhibitory effect is observed. Modified phosphodiester analogs, such as P-ethoxy, have been made to overcome this nuclease hydrolysis problem, but they have not provided a satisfactory solution to the problem.

The cellular uptake of antisense oligonucleotides is low. To solve this problem, physical techniques, such as calcium-phosphate precipitation, DEAE-dextran mediation, or electroporation, have been used to increase the cellular uptake of oligonucleotides. These techniques are difficult to reproduce and are inapplicable in vivo. Cationic lipids, such as Lipofectin, have also been used to deliver oligonucleotides. An electrostatic interaction is formed between the cationic lipids and the negatively charged oligonucleotides, which results in a complex that is then taken up by the target cells. Since these cationic lipids do not protect the oligonucleotides from nuclease digestion and are harmful to the cell membrane, they are only useful in delivering the nuclease-resistant phosphorothioates, but not the nuclease-cleavable phosphodiesters.

Another modified phosphodiester analog that has been prepared is P-ethoxy. The P-ethoxy antisense backbone does not have an adverse effect on bleeding and complement activation, which are some of the toxicities that have been reported for other antisense analogs. The modifications of P-ethoxy oligonucleotides are made in the phosphate backbone so that the modification will not interfere with the binding of these oligonucleotides to a target mRNA. P-ethoxy oligonucleotides are made by adding an ethyl group to the non-bridging oxygen atom of the phosphate backbone, thus rendering these oligonucleotides uncharged compounds. In spite of their resistance to nucleases, the cellular uptake and intracellular delivery of P-ethoxy oligonucleotides is poor because upon internalization, these oligonucleotides remain sequestered inside the endosomal/lysosomal vacuoles, impeding their access to target mRNA.

A. P-Ethoxy Antisense Drug Product

The liposomal P-ethoxy antisense drug product is composed of two cGMP products, both of which have a FDA-required Certificate of Analysis with FDA-approved release criteria. The raw materials, solvents, and final drug product are described herein. When manufactured, the drug product is a lyophilized crystal or powder of amber or white color that comprises the following materials: oligonucleotide (e.g., P-ethoxy antisense drug substance), neutral lipids (e.g., DOPC), and surfactant (e.g., polysorbate 20). In preparation for administration to a patient, normal saline is added to the vial, at which time liposomes are formed with the P-ethoxy antisense incorporated into the interior.

B. P-Ethoxy Antisense Drug Substance

Specific physical properties (e.g., solubility and hydrophobicity, which then affect drug product solubility in saline, incorporation of oligo into liposomes, and liposome particle size) of the finished product can be defined using a pre-determined P-ethoxy and phosphodiester amidite raw material mix during production of the P-ethoxy antisense drug substance. While loss of the P-ethoxy backbone group randomly occurs during oligonucleotide manufacturing resulting in phosphodiester bonds at those linkages, that loss may not generate the preferred ratio of P-ethoxy:phosphodiester backbone linkage within the oligonucleotide. In this case, the mix of P-ethoxy and phosphodiester amidite raw material supplements the expected value of P-ethoxy backbone deletions, thus generating an oligonucleotide with the desired ratio. Increasing the number of P-ethoxy molecules in the backbone of the oligonucleotide causes the molecule to be more hydrophobic (which results in larger liposome particles; Table 1), less polar, and less soluble (Table 2). Methods of testing the charge-neutral, hydrophobic P-ethoxy drug substance include mass spectrometry to determine the distribution of oligonucleotide lengths and assays to determine the solubility of drug substance, which for practical purposes for solubility is a visual inspection of the drug product reconstituted in saline. As the oligonucleotide becomes less soluble due to a greater number of P-ethoxy backbone linkages the reconstituted solution becomes whiter until particulates form as hydrophobicity becomes too high.

Formulation must use a particle size, wherein the 90% value is less than 5000 nm in size and is soluble, which is a function of the nucleotide composition. By way of example, if an oligonucleotide is 18-20 nucleotides in length, then at least five of the phosphate backbone linkages should be phosphodiester backbone linkages. This is supported clearly by the Experiments 7-10 below in Table 1, which provides data from 18mer oligonucleotides. Wherein if an oligonucleotide is 25 nucleotides in length, then at least six of the phosphate backbone linkages should be phosphodiester backbone linkages.

TABLE 1

Liposome Particle Size Variability with Antisense Backbone Composition of oligonucleotides of 18 mer

| Experiment | Engineered Antisense Backbone | Post-Manufacturing Backbone Ethyl Deletion | | Particle Size Characteristics: Cumulative Distribution Function | | |
|---|---|---|---|---|---|---|
| | | Principal Peak[d] | Composite Deletion[e] | 90% Value (nm) ** | 50% Value (nm) | 300 nm Value (%) |
| 1 | 3 amidite substitution | −6 | −5.67 | 2130 | 911 | 15.30 |
| 2 | 3 amidite substitution | −6 | −5.67 | 2420 | 1004 | 15.50 |
| 3 | 3 amidite substitution | −6 | −6.12 | 3682 | 943 | 15.50 |
| 4 | 3 amidite substitution | −7 | −6.66 | 3805 | 978 | 14.60 |
| 5 | 100% P-ethoxy | −5 | −5.66 | 3924 | 976 | 16.00 |
| 6 | 2 amidite substitution | −5 | −5.32 | 4387 | 1888 | 11.60 |
| 7[a] | 100% P-ethoxy | −4 | −4.22 | 5057 | 1131 | 17.70 |
| 8 | 100% P-ethoxy | −4 | −4.52 | 5659 | 1359 | 10.00 |
| 9[b] | 100% P-ethoxy | −4 | −4.38 | 7571 | 1909 | 2.60 |
| 10[c] | 100% P-ethoxy | −4 | −4.38 | 7994 | 1653 | 14.40 |

** Drug product release criteria is for 90% of the liposome particles to be less than or equal to 5000 nm.
[a]This lot was discarded due to poor solubility; specifically, antisense particles in the reconstituted solution.
[b]This lot had lower DMSO and tBA volume with 2 mg antisense in a 20 mL vial, which added an additional component to liposome enlargement.
[c]This lot was not released because it failed the particle size release spec.
[d]The principal peak represents the most common number of p-ethoxy deletions in the oligonucleotides of the population.
[e]The composite deletion represents the average number of p-ethoxy deletions in the population of oligonucleotides.

TABLE 2

Liposome Particle Solubility with Antisense Backbone Composition

| Experiment | Engineered Antisense Backbone | Post-Manufacturing Backbone Ethyl Deletion | | Drug Solubility | |
|---|---|---|---|---|---|
| | | Principal Peak | Composite Deletion | Visual Observation ** | Solubility Assessment |
| 1 | 3 amidite substitution | −6 | −5.67 | skim milk solution | good |
| 2 | 3 amidite substitution | −6 | −5.67 | skim milk solution | good |
| 3 | 3 amidite substitution | −6 | −6.12 | skim milk solution | good |
| 4 | 3 amidite substitution | −7 | −6.66 | skim milk solution | good |
| 5 | 100% P-ethoxy | −5 | −5.66 | skim milk solution | good |
| 6 | 2 amidite substitution | −5 | −5.32 | skim milk solution | good |
| 7 | 100% P-ethoxy | −4 | −4.52 | white solution | pass |
| 8[b] | 100% P-ethoxy | −4 | −4.38 | white solution | pass |

TABLE 2-continued

Liposome Particle Solubility with Antisense Backbone Composition

| | | Post-Manufacturing Backbone Ethyl Deletion | | Drug Solubility | |
|---|---|---|---|---|---|
| Experiment | Engineered Antisense Backbone | Principal Peak | Composite Deletion | Visual Observation ** | Solubility Assessment |
| 9[c] | 100% P-ethoxy | −4 | −4.38 | white solution | pass |
| 10[a] | 100% P-ethoxy | −4 | −4.22 | white solution particles | fail |

** If the drug product sample has particles the lot will be rejected
[a]This lot was discarded due to poor solubility; specifically, antisense particles in the reconstituted solution.
[b]This lot had lower DMSO and tBA volume with 2 mg antisense in a 20 mL vial, which added an additional component to liposome enlargement.
[c]This lot was not released because it failed the particle size release spec.

C. Formulation, Filtration, and Lyophilization of Liposomal P-Ethoxy Antisense Drug Product One gram (1 g) of pE oligos is dissolved in DMSO at a ratio of 10 mg oligonucleotide per 1 mL DMSO. Next, DOPC is added to tert-butyl alcohol at a ratio of 1 g DOPC per 1719 mL of tert-butyl alcohol. The oligo and DOPC are combined and mixed at a ratio of 1 g oligonucleotide per 2.67 g DOPC. Then, 20 mL of a 0.835% (v/v) solution of polysorbate 20 is added to the mixture resulting in a final concentration of 0.039 mg/mL. The solution is passed through a sterile filter prior to dispensing into glass vials for lyophilization.

The effect of the surfactant on liposome particle size was determined by titrating the amount of surfactant (Table 3). In the absence of polysorbate 20, only 2.8% of the particles had a diameter of 300 nm or less. In the presence of 1× polysorbate 20, 12.5% of the particles had a diameter of 300 nm or less. With the addition of 3×-10× polysorbate 20, around 20% of the particles had a diameter of 300 nm or less. Thus an increase in surfactant from 1× to 3× results in a decrease in particle size.

TABLE 3

Liposome Particle Size Variability with Surfactant

| | | Particle Size Characteristics: Cumulative Distribution Function | | |
|---|---|---|---|---|
| Experiment | Amount of Surfactant | 50% Value | 90% Value ** | 300 nm Value |
| 1 | 0x | 5301 nm | 10719 nm | 2.8% |
| 2 | 1x | 1053 nm | 4054 nm | 12.5% |
| 3 | 3x | 785 nm | 2926 nm | 19.1% |
| 4 | 5x | 721 nm | 2691 nm | 21.9% |
| 5 | 10x | 734 nm | 2937 nm | 21.4% |

** Drug product release criteria is for 90% of the liposome particles to be less than or equal to 5000 nm.

D. Preparation of Liposomal P-Ethoxy Antisense Drug Product for Administration

The lyophilized preparation was hydrated with normal saline (0.9%/10 mM NaCl) at a final oligo concentration of 10-5000 μM. The liposomal-P-ethoxy oligos were mixed by hand shaking.

E. Methods of Testing Liposomal P-Ethoxy Antisense Drug Product

Visual Inspection of Manufactured Drug Product: After manufacturing, a sample vial containing drug product is selected and visually inspected. The absence of liquid is mandatory, and then amber crystals at the bottom of the vial are acceptable, and increasing in acceptance to a white, flocculated powder or appearance, the best result. The white appearance indicates a better drying process, with a high surface area to mass ratio, which is very conducive to reconstitution for use.

Visual Inspection of Reconstituted Drug Ready for Patient IV: Normal saline is added to a vial containing the manufactured Liposomal P-ethoxy Antisense Drug Product and shaken to reconstitute into a solution with the drug crystal or powder completely dissolved. Three main observations are made: 1) that the crystal or powder is completely dissolved, 2) there are no white clumps of undissolved material, and 3) the appearance is a milky white or skim milk appearance. The bluer the appearance of the reconstituted liquid, the better, as this signals a smaller liposome particle size that reflects light in the blue spectrum.

Mass Spectrometry: Mass spectrometry (mass spec) is used to display the profile of the various masses in a sample. When P-ethoxy antisense material is produced, a mass spec is run on the sample. The result shows peaks of material present on a grid that has increasing mass on the "x" axis to the right, and relative mass abundance on the "y" axis increasing upward. The profile from a sample is analyzed to determine the relative quantity of P-ethoxy backbones in the P-ethoxy sample, recognizing that the profile of peaks represents (starting farthest to the right), full length material with all backbones comprised of the P-ethoxy linkage, the next peak moving left a full length with one backbone with a P-ethoxy deletion (and therefore, the ethyl being knocked off and the result being a normal phosphodiester backbone linkage), and continuing. The mass spec pattern shifted to the right represents a P-ethoxy sample having more P-ethoxy backbones, and therefore having the properties of being more hydrophobic and less soluble; and likewise, shifted to the left having the opposite effects. Inspection of the mass spec chart of a sample also can be used to determine if filtration during manufacturing produces any adverse effects on oligonucleotide composition present in the filtered drug product.

UV Testing: Ultraviolent light testing is used to determine the mass of oligonucleotide present in a sample. Oligonucleotides absorb light in the 260 nanometer range. As a result, UV testing of the finished reconstituted drug product has come to be used as a method in determining the quantity of oligonucleotide drug substance in a vial of drug product. In terms of manufacturing development and innovations, UV testing was used to determine if there were problems experienced during filtration in manufacturing or poor solubility of the P-ethoxy antisense drug substance, resulting in less oligonucleotide in solution and therefore a lower UV reading. The method will be validated and likely become part of the final product release testing.

Liposome Particle Size: A vial of finished drug product is reconstituted and tested for liposome particle size. The result is often a roughly normal distribution, having a central point, tails and average values or a roughly normal distribution of the majority of the particles and smaller, secondary peaks of the smaller liposomes particles resulting from second-order particle formation effects. It is important that liposome particles not be too large, as they may create adverse effects in patients (for example, create blood flow problems in smaller blood vessels in the lungs). As a result, the drug product release criteria include that particle size testing show that 90% of liposomes be 5 microns or less in size. In addition, smaller liposomes are preferred because they will have better uptake into cells, and secondly, smaller liposomes can penetrate vascular pores, thereby allowing the liposomes to penetrate inside tumors, increasing treatment effectiveness of a Liposomal P-ethoxy Antisense Drug Product.

V. METHODS OF TREATMENT

Certain aspects of the present invention provide an oligonucleotide-lipid complex (e.g., an oligonucleotide incorporated into a non-charged liposome) for treating diseases, such as cancer, autoimmune disease, or infectious disease. Certain aspects of the present invention provide an oligonucleotide-lipid complex (e.g., an oligonucleotide incorporated into a non-charged liposome) for enhancing an immune response, such as an immune response induced by vaccination, in a subject, thereby enhancing therapeutic immunity. Particularly, the oligonucleotide may have a sequence that allows for base pairing with a human nucleotide sequence (e.g., IGF-1R) and thus may inhibit the expression of a protein encoded by the human nucleotide sequence.

The expression of IGF-1R, and potentially genes downstream of IGF-1R, such as, for example, hexokinase, may be downregulated in a cell exposed to the oligonucleotide. The cell may be a mammalian cell. The cell may be a cancer cell. The cell may be a cell of the immune system, such as, for example, a monocyte, neutrophil, eosinophil, basophil, leukocyte, natural killer (NK) cell, lymphocyte, T cell, B cell, dendritic cell, mast cell, or macrophage. The functions of macrophages include phagocytosis, antigen presentation, and cytokine presentation. The macrophage may be a M2 macrophage, which produces higher levels of IGF-1R than a M1 macrophage and expresses one or more of CD11b, CD14, CD15, CD23, CD64, CD68, CD163, CD204, CD206 on its cell surface. The monocyte may be a M2 monocyte, which expresses one or more of CD11b, CD14, CD15, CD23, CD64, CD68, CD163, CD204, CD206 on its cell surface. Inhibiting the expression of IGF-1R in an undifferentiated monocyte or macrophage may prevent the undifferentiated monocyte or macrophage from being polarized to be a M2 monocyte or macrophage. Inhibiting the expression of IGF-1R in a M2 monocyte or macrophage may cause the M2 monocyte or macrophage to lose its M2 phenotype and function, and/or undergo cell cycle arrest, and/or undergo cell death, such as, for example, apoptosis or necrosis. Inhibiting the expression of IGF-1R in macrophages may selectively affect M2 macrophages over M1 macrophages because M2 macrophages produce higher levels of IGF-1R than M1 macrophages.

"Treatment" and "treating" refer to administration or application of a therapeutic agent to a subject or performance of a procedure or modality on a subject for the purpose of obtaining a therapeutic benefit of a disease or health-related condition. For example, a treatment may include administration of a pharmaceutically effective amount of an IGF-1R oligonucleotide-lipid complex.

"Subject" and "patient" refer to either a human or non-human, such as primates, mammals, and vertebrates. In particular embodiments, the subject is a human.

The term "therapeutic benefit" or "therapeutically effective" as used throughout this application refers to anything that promotes or enhances the well-being of the subject with respect to the medical treatment of this condition. This includes, but is not limited to, a reduction in the frequency or severity of the signs or symptoms of a disease. For example, treatment of cancer may involve, for example, a regression of a tumor, a reduction in the size of a tumor, a reduction in the invasiveness of a tumor, reduction in the growth rate of the cancer, prevention of metastasis, or elimination of a tumor. Treatment of cancer may also refer to prolonging survival of a subject with cancer. Treatment of an autoimmune disease may involve, for example, reducing the expression of a self-antigen against which there is an undesired immune response, inducing tolerance of a self-antigen against which there is an undesired immune response, or inhibiting the immune response towards the self-antigen. Treatment of an infectious disease may involve, for example, eliminate the infectious agent, reduce the level of the infectious agent, or maintain the level of the infectious agent at a certain level.

Tumors for which the present treatment methods are useful include any malignant cell type, such as those found in a solid tumor, a hematological tumor, metastatic cancer, or non-metastatic cancer. Exemplary solid tumors can include, but are not limited to, a tumor of an organ selected from the group consisting of pancreas, colon, cecum, esophagus, gastrointestine, gum, liver, skin, stomach, testis, tongue, uterus, stomach, brain, head, neck, ovary, kidney, larynx, sarcoma, bone, lung, bladder, melanoma, prostate, and breast. Exemplary hematological tumors include tumors of the bone marrow, T or B cell malignancies, leukemias, lymphomas, such as, for example, diffuse large B-cell lymphoma, blastomas, myelomas, and the like. Further examples of cancers that may be treated using the methods provided herein include, but are not limited to, carcinoma, lymphoma, blastoma, sarcoma, leukemia, squamous cell cancer, lung cancer (including small-cell lung cancer, non-small cell lung cancer, adenocarcinoma of the lung, and squamous carcinoma of the lung), cancer of the peritoneum, hepatocellular cancer, gastric or stomach cancer (including gastrointestinal cancer and gastrointestinal stromal cancer), pancreatic cancer, glioblastoma, cervical cancer, ovarian cancer, liver cancer, bladder cancer, breast cancer, colon cancer, colorectal cancer, endometrial or uterine carcinoma, salivary gland carcinoma, kidney or renal cancer, prostate cancer, vulval cancer, thyroid cancer, various types of head and neck cancer, melanoma, superficial spreading melanoma, lentigo malignant melanoma, acral lentiginous melanomas, nodular melanomas, as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; diffuse large B-cell lymphoma; mantle cell lymphoma; AIDS-related lymphoma; and Waldenstrom's macroglobulinemia), chronic lymphocytic leukemia (CLL), acute lymphoblastic leukemia (ALL), Hairy cell leukemia, multiple myeloma, acute myeloid leukemia (AML) and chronic myeloblastic leukemia.

The cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extramammary paraganglioma, malignant; pheochromocytoma; glomangiosarcoma; malignant melanoma; amelanotic melanoma; superficial spreading melanoma; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma (grade I, grade II, grade III, or grade IV); protoplasmic astrocytoma; fibrillary astrocytoma; astroblastoma; glioblastoma; glioblastoma multiforme; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; hodgkin's disease; hodgkin's; paragranuloma; malignant lymphoma, small lymphocytic; malignant lymphoma, large cell, diffuse; malignant lymphoma, follicular; mycosis fungoides; other specified non-hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia.

Autoimmune diseases for which the present treatment methods are useful include, without limitation, lupus, scleroderma, atopic eczema, sinusitis, asthma, allergies, multiple chemical sensitivity, type 1 diabetes, Hashimoto's thyroiditis, Grave's disease, lichen planus, spondyloarthropathy, ankylosing spondylitis, psoriatic arthritis, reactive arthritis, enteropathic arthritis, diabetes mellitus, celiac disease, autoimmune thyroid disease, autoimmune liver disease, Addison's disease, transplant rejection, graft vs. host disease, host vs. graft disease, ulcerative colitis, Crohn's disease, irritable bowel disease, inflammatory bowel disease, rheumatoid arthritis, juvenile rheumatoid arthritis, familial Mediterranean fever, amyotrophic lateral sclerosis, Sjogren's syndrome, early arthritis, viral arthritis, multiple sclerosis, or psoriasis. The diagnosis and treatment of these diseases are well documented in the literature.

Infectious diseases for which the present treatment methods are useful include, without limitation, bacterial infections, viral infections, fungal infections, and parasitic infections. Exemplary viral infections include hepatitis B virus, hepatitis C virus, human immunodeficiency virus 1, human immunodeficiency virus 2, human papilloma virus, herpes simplex virus 1, herpes simplex virus 2, herpes zoster, varicella zoster, coxsackievirus A16, cytomegalovirus, ebola virus, enterovirus, Epstein-Barr virus, hanta virus, hendra virus, viral meningitis, respiratory syncytial virus, rotavirus, west nile virus, adenovirus, and influenza virus infections. Exemplary bacterial infections include *Chlamydia trachomatis, Listeria monocytogenes, Helicobacter pylori, Escherichia coli, Borelia burgdorferi, Legionella* pneumophilia, Mycobacteria sps (e.g., *M. tuberculosis, M. avium, M. intraceliuiar e, M. kansaii, M. gordonae*), *Staphylococcus aureus, Neisseria gonorrhoeae, Neisseria meningitides, Streptococcus pyogenes* (Group A *Streptococcus*), *Streptococcus agalactiae* (Group B *Streptococcus*), *Streptococcus* (*viridans* group), *Streptococcus faecalis, Streptococcus bovis, Streptococcus* (anaerobic sps.), *Streptococcus pneumoniae,* pathogenic *Campylobacter* sp., *Enterococcus* sp., *Haemophilus influenzae, Bacillus anthracis, Corynebacterium diphtheriae, corynebacterium* sp., *Erysipelothrix rhusiopathiae, Clostridium perfringers, Clostridium tetani, Enterobacter aerogenes, Klebsiella pneumoniae, Pasteurella multocida, Bacteroides* sp., *Fusobacterium nucleatum, Streptobacillus moniliformis, Treponema pallidium, Treponema pertenue, Leptospira, Rickettsia, Actinomyces israelli, Shigella* sps (e.g., *S. flexneri, S. sonnei, S. dysenteriae*), and *Salmonella* spp infections. Exemplary fungal infections include *Candida albicans, Candida glabrata, Aspergillus fumigatus, Aspergillus terreus, Cryptococcus neoformans, Histoplasma capsulatum, Coccidioides immitis, Blastomyces dermatitidis,* and *Chlamydia irachomatis* infections.

The oligonucleotide-lipid complex may be used herein as an antitumor, antiviral, antibacterial, antifungal, antiparasite, or anti-autoimmune agent in a variety of modalities. In a particular embodiment, the invention contemplates methods of using an oligonucleotide-lipid complex comprises contacting a population of diseased cells with a therapeutically effective amount of an oligonucleotide-lipid complex for a time period sufficient to inhibit or reverse disease.

In one embodiment, the contacting in vivo is accomplished by administering, by intravenous, intraperitoneal, subcutaneous, or intratumoral injection, a therapeutically effective amount of a physiologically tolerable composition comprising an oligonucleotide-lipid complex of this invention to a patient. The oligonucleotide-lipid complex can be administered parenterally by injection or by gradual infusion over time.

Therapeutic compositions comprising oligonucleotide-lipid complex are conventionally administered intravenously or subcutaneously, such as by injection of a unit dose, for example. The term "unit dose" when used in reference to a therapeutic composition refers to physically discrete units suitable as unitary dosage for the subject, each unit containing a predetermined quantity of active material calculated to produce the desired therapeutic effect in association with the required diluent, i.e., carrier, or vehicle.

The compositions are administered in a manner compatible with the dosage formulation, and in a therapeutically effective amount. The quantity to be administered depends on the subject to be treated, capacity of the subject's system to utilize the active ingredient, and degree of therapeutic effect desired. Precise amounts of active ingredient required to be administered depend on the judgment of the practitioner and are peculiar to each individual. However, suitable dosage ranges for systemic application are disclosed herein and depend on the route of administration. Suitable regimes for initial and booster administration are also contemplated and are typified by an initial administration followed by repeated doses at one or more hour intervals by a subsequent injection or other administration. Exemplary multiple administrations are described herein and are particularly preferred to maintain continuously high serum and tissue levels of polypeptide. Alternatively, continuous intravenous infusion sufficient to maintain concentrations in the blood in the ranges specified for in vivo therapies are contemplated.

It is contemplated that an oligonucleotide of the invention can be administered systemically or locally to treat disease, such as to inhibit tumor cell growth or to kill cancer cells in cancer patients with locally advanced or metastatic cancers. They can be administered intravenously, intrathecally, subcutaneously, and/or intraperitoneally. They can be administered alone or in combination with anti-proliferative drugs. In one embodiment, they are administered to reduce the cancer load in the patient prior to surgery or other procedures. Alternatively, they can be administered after surgery to ensure that any remaining cancer (e.g., cancer that the surgery failed to eliminate) does not survive.

A therapeutically effective amount of an oligonucleotide is a predetermined amount calculated to achieve the desired effect, i.e., to inhibit the expression of a target protein. Thus, the dosage ranges for the administration of oligonucleotides of the invention are those large enough to produce the desired effect. The dosage should not be so large as to cause adverse side effects, such as hyperviscosity syndromes, pulmonary edema, congestive heart failure, neurological effects, and the like. Generally, the dosage will vary with age of, condition of, sex of, and extent of the disease in the patient and can be determined by one of skill in the art. The dosage can be adjusted by the individual physician in the event of any complication.

A composition of the present invention is preferably administered to a patient parenterally, for example by intravenous, intraarterial, intramuscular, intralymphatic, intraperitoneal, subcutaneous, intrapleural, or intrathecal injection, or may be used ex vivo. Preferred dosages are between 5-25 mg/kg. The administration is preferably repeated on a timed schedule until the cancer disappears or regresses, and may be in conjunction with other forms of therapy.

VI. PHARMACEUTICAL PREPARATIONS

A pharmaceutical composition comprising the liposomes will usually include a sterile, pharmaceutically acceptable carrier or diluent, such as dextrose or saline solution.

Where clinical application of non-charged lipid component (e.g., in the form of a liposome) containing an oligonucleotide is undertaken, it will generally be beneficial to prepare the lipid complex as a pharmaceutical composition appropriate for the intended application. This will typically entail preparing a pharmaceutical composition that is essentially free of pyrogens, as well as any other impurities that could be harmful to humans or animals. One may also employ appropriate buffers to render the complex stable and allow for uptake by target cells.

The phrases "pharmaceutical or pharmacologically acceptable" refers to molecular entities and compositions that do not produce an adverse, allergic or other untoward reaction when administered to an animal, such as a human, as appropriate. The preparation of a pharmaceutical composition that contains at least one non-charged lipid component comprising an oligonucleotide or additional active ingredient will be known to those of skill in the art in light of the present disclosure, as exemplified by Remington: The Science and Practice of Pharmacy, 21st, 2005, incorporated herein by reference. Moreover, for animal (e.g., human) administration, it will be understood that preparations should meet sterility, pyrogenicity, general safety and purity standards as required by FDA Office of Biological Standards.

As used herein, "pharmaceutically acceptable carrier" includes any and all solvents, dispersion media, coatings, surfactants, antioxidants, preservatives (e.g., antibacterial agents, antifungal agents), isotonic agents, absorption delaying agents, salts, preservatives, drugs, drug stabilizers, gels, binders, excipients, disintegration agents, lubricants, sweetening agents, flavoring agents, dyes, such like materials and combinations thereof, as would be known to one of ordinary skill in the art. A pharmaceutically acceptable carrier is preferably formulated for administration to a human, although in certain embodiments it may be desirable to use a pharmaceutically acceptable carrier that is formulated for administration to a non-human animal but which would not be acceptable (e.g., due to governmental regulations) for administration to a human. Except insofar as any conventional carrier is incompatible with the active ingredient, its use in the therapeutic or pharmaceutical compositions is contemplated.

The actual dosage amount of a composition of the present invention administered to a patient or subject can be determined by physical and physiological factors such as body weight, severity of condition, the type of disease being treated, previous or concurrent therapeutic interventions, idiopathy of the patient and on the route of administration. The practitioner responsible for administration will, in any event, determine the concentration of active ingredient(s) in a composition and appropriate dose(s) for the individual subject.

In certain embodiments, pharmaceutical compositions may comprise, for example, at least about 0.1% of an active compound. In other embodiments, the an active compound may comprise between about 0.1% to about 75% of the weight of the unit, or between about 25% to about 60%, for example, and any range derivable therein. In other non-limiting examples, a dose may also comprise from about 1 microgram/kg/body weight, about 5 microgram/kg/body weight, about 10 microgram/kg/body weight, about 50 microgram/kg/body weight, about 100 microgram/kg/body weight, about 200 microgram/kg/body weight, about 350 microgram/kg/body weight, about 500 microgram/kg/body weight, about 1 milligram/kg/body weight, about 5 milligram/kg/body weight, about 10 milligram/kg/body weight, about 50 milligram/kg/body weight, about 100 milligram/kg/body weight, about 200 milligram/kg/body weight, about 350 milligram/kg/body weight, about 500 milligram/kg/body weight, to about 1000 mg/kg/body weight or more per administration, and any range derivable therein. In non-limiting examples of a derivable range from the numbers listed herein, a range of about 5 μg/kg/body weight to about 1000 mg/kg/body weight, about 5 microgram/kg/body weight to about 500 milligram/kg/body weight, etc., can be administered.

An oligonucleotide of the present embodiments may be administered in a dose of 1, 2, 3, 4, 5, 6, 7, 8, 9, 10, 15, 20, 25, 30, 40, 50, 60, 70, 80, 90, 100 or more μg of nucleic acid per dose. Each dose may be in a volume of 1, 10, 50, 100, 200, 500, 1000 or more μl or ml.

Solutions of therapeutic compositions can be prepared in water suitably mixed with a surfactant, such as hydroxypropylcellulose. Dispersions also can be prepared in glycerol, liquid polyethylene glycols, and mixtures thereof and in oils. Under ordinary conditions of storage and use, these preparations contain a preservative to prevent the growth of microorganisms.

The therapeutic compositions of the present invention are advantageously administered in the form of injectable compositions either as liquid solutions or suspensions; solid forms suitable for solution in, or suspension in, liquid prior to injection may also be prepared. These preparations also may be emulsified. A typical composition for such purpose comprises a pharmaceutically acceptable carrier. For instance, the composition may contain 10 mg, 25 mg, 50 mg or up to about 100 mg of human serum albumin per milliliter of phosphate buffered saline. Other pharmaceutically acceptable carriers include aqueous solutions, non-toxic excipients, including salts, preservatives, buffers and the like.

Examples of non-aqueous solvents are propylene glycol, polyethylene glycol, vegetable oil and injectable organic esters such as ethyloleate. Aqueous carriers include water, alcoholic/aqueous solutions, saline solutions, parenteral vehicles such as sodium chloride, Ringer's dextrose, etc. Intravenous vehicles include fluid and nutrient replenishers. Preservatives include antimicrobial agents, anti-oxidants, chelating agents and inert gases. The pH and exact concentration of the various components the pharmaceutical composition are adjusted according to well-known parameters.

The therapeutic compositions of the present invention may include classic pharmaceutical preparations. Administration of therapeutic compositions according to the present invention will be via any common route so long as the target tissue is available via that route. This includes oral, nasal, buccal, rectal, vaginal or topical. Topical administration may be particularly advantageous for the treatment of skin cancers, to prevent chemotherapy-induced alopecia or other dermal hyperproliferative disorder. Alternatively, administration may be by orthotopic, intradermal, subcutaneous, intramuscular, intraperitoneal or intravenous injection. Such compositions would normally be administered as pharmaceutically acceptable compositions that include physiologically acceptable carriers, buffers or other excipients. For treatment of conditions of the lungs, aerosol delivery can be used. Volume of the aerosol is between about 0.01 ml and 0.5 ml.

An effective amount of the therapeutic composition is determined based on the intended goal. The term "unit dose" or "dosage" refers to physically discrete units suitable for use in a subject, each unit containing a predetermined-quantity of the therapeutic composition calculated to produce the desired responses discussed above in association with its administration, i.e., the appropriate route and treatment regimen. The quantity to be administered, both according to number of treatments and unit dose, depends on the protection or effect desired.

Precise amounts of the therapeutic composition also depend on the judgment of the practitioner and are peculiar to each individual. Factors affecting the dose include the physical and clinical state of the patient, the route of administration, the intended goal of treatment (e.g., alleviation of symptoms versus cure) and the potency, stability and toxicity of the particular therapeutic substance.

VII. COMBINATION TREATMENTS

In certain embodiments, the compositions and methods of the present invention involve an inhibitory oligonucleotide, or oligonucleotide capable of expressing an inhibitor of gene expression, in combination with a second or additional therapy. The methods and compositions including combination therapies enhance the therapeutic or protective effect, and/or increase the therapeutic effect of another anti-cancer or anti-hyperproliferative therapy. Therapeutic and prophylactic methods and compositions can be provided in a combined amount effective to achieve the desired effect, such as the killing of a cancer cell and/or the inhibition of cellular hyperproliferation. This process may involve contacting the cells with both an inhibitor of gene expression and a second therapy. A tissue, tumor, or cell can be contacted with one or more compositions or pharmacological formulation(s) including one or more of the agents (i.e., inhibitor of gene expression or an anti-cancer agent), or by contacting the tissue, tumor, and/or cell with two or more distinct compositions or formulations, wherein one composition provides 1) an inhibitory oligonucleotide; 2) an anti-cancer agent, or 3) both an inhibitory oligonucleotide and an anti-cancer agent. Also, it is contemplated that such a combination therapy can be used in conjunction with a chemotherapy, radiotherapy, surgical therapy, or immunotherapy.

An inhibitory oligonucleotide may be administered before, during, after or in various combinations relative to an anti-cancer treatment. The administrations may be in intervals ranging from concurrently to minutes to days to weeks. In embodiments where the inhibitory oligonucleotide is provided to a patient separately from an anti-cancer agent, one would generally ensure that a significant period of time did not expire between the time of each delivery, such that the two compounds would still be able to exert an advantageously combined effect on the patient. In such instances, it is contemplated that one may provide a patient with the inhibitory oligonucleotide therapy and the anti-cancer therapy within about 12 to 24 or 72 h of each other and, more preferably, within about 6-12 h of each other. In some situations it may be desirable to extend the time period for treatment significantly where several days (2, 3, 4, 5, 6 or 7) to several weeks (1, 2, 3, 4, 5, 6, 7 or 8) lapse between respective administrations.

In certain embodiments, a course of treatment will last 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90 days or more. It is contemplated that one agent may be given on day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and/or 90, any combination thereof, and another agent is given on day 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and/or 90, or any combination thereof. Within a single day (24-hour period), the patient may be given one or multiple administrations of the agent(s). Moreover, after a course of treatment, it is contemplated that there is a period of time at which no anti-cancer treatment is administered. This time period may last 1, 2, 3, 4, 5, 6, 7 days, and/or 1, 2, 3, 4, 5 weeks, and/or 1, 2, 3, 4, 5, 6, 7, 8, 9, 10, 11, 12 months or more, depending on the condition of the patient, such as their prognosis, strength, health, etc.

Various combinations may be employed. For the example below an inhibitory oligonucleotide therapy is "A" and an anti-cancer therapy is "B":

A/B/A B/A/B B/B/A A/A/B A/B/B B/A/A A/B/B/B
B/A/B/B B/B/B/A B/B/A/B A/A/B/B A/B/A/B A/B/B/A
B/B/A/A B/A/B/A B/A/A/B A/A/A/B B/A/A/A A/B/A/A
A/A/B/A

Administration of any compound or therapy of the present invention to a patient will follow general protocols for the administration of such compounds, taking into account the toxicity, if any, of the agents. Therefore, in some embodiments there is a step of monitoring toxicity that is attributable to combination therapy. It is expected that the treatment cycles would be repeated as necessary. It also is contemplated that various standard therapies, as well as surgical intervention, may be applied in combination with the described therapy.

In specific aspects, it is contemplated that a standard therapy will include chemotherapy, radiotherapy, immunotherapy, surgical therapy or gene therapy and may be employed in combination with the inhibitor of gene expression therapy, anticancer therapy, or both the inhibitor of gene expression therapy and the anti-cancer therapy, as described herein.

A. Chemotherapy

A wide variety of chemotherapeutic agents may be used in accordance with the present embodiments. The term "chemotherapy" refers to the use of drugs to treat cancer. A "chemotherapeutic agent" is used to connote a compound or composition that is administered in the treatment of cancer. These agents or drugs are categorized by their mode of activity within a cell, for example, whether and at what stage they affect the cell cycle. Alternatively, an agent may be characterized based on its ability to directly cross-link DNA, to intercalate into DNA, or to induce chromosomal and mitotic aberrations by affecting nucleic acid synthesis.

Examples of chemotherapeutic agents include alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaI1 and calicheamicin omegaI1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein tansferase inhibitors, transplatinum, and pharmaceutically acceptable salts, acids, or derivatives of any of the above.

B. Radiotherapy

Other factors that cause DNA damage and have been used extensively include what are commonly known as γ-rays, X-rays, and/or the directed delivery of radioisotopes to tumor cells. Other forms of DNA damaging factors are also contemplated such as microwaves, proton beam irradiation (U.S. Pat. Nos. 5,760,395 and 4,870,287) and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells.

The terms "contacted" and "exposed," when applied to a cell, are used herein to describe the process by which a therapeutic construct and a chemotherapeutic or radiotherapeutic agent are delivered to a target cell or are placed in direct juxtaposition with the target cell. To achieve cell killing, for example, both agents are delivered to a cell in a combined amount effective to kill the cell or prevent it from dividing.

C. Immunotherapy

In the context of cancer treatment, immunotherapeutics, generally, rely on the use of immune effector cells and molecules to target and destroy cancer cells. Trastuzumab (Herceptin™) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a tumor cell target. Various effector cells include cytotoxic T cells and NK cells. The combination of therapeutic modalities, i.e., direct cytotoxic activity and inhibition or reduction of ErbB2 would provide therapeutic benefit in the treatment of ErbB2 overexpressing cancers.

Another immunotherapy could also be used as part of a combined therapy with gen silencing therapy discussed above. In one aspect of immunotherapy, the tumor cell must bear some marker that is amenable to targeting, i.e., is not present on the majority of other cells. Many tumor markers exist and any of these may be suitable for targeting in the context of the present invention. Common tumor markers include carcinoembryonic antigen, prostate specific antigen, urinary tumor associated antigen, fetal antigen, tyrosinase (p97), gp68, TAG-72, HMFG, Sialyl Lewis Antigen, MucA, MucB, PLAP, estrogen receptor, laminin receptor, erb B and p155. An alternative aspect of immunotherapy is to combine anticancer effects with immune stimulatory effects. Immune stimulating molecules also exist including: cytokines such as IL-2, IL-4, IL-12, GM-CSF, gamma-IFN, chemokines such as MIP-1, MCP-1, IL-8 and growth factors such as FLT3 ligand. Combining immune stimulating molecules, either as proteins or using gene delivery in combination with a tumor suppressor has been shown to enhance anti-tumor effects. Moreover, antibodies against any of these compounds can be used to target the anti-cancer agents discussed herein.

Examples of immunotherapies currently under investigation or in use are immune adjuvants e.g., *Mycobacterium bovis, Plasmodium falciparum*, dinitrochlorobenzene and aromatic compounds (U.S. Pat. Nos. 5,801,005 and 5,739,169; Hui and Hashimoto, 1998; Christodoulides et al., 1998), cytokine therapy, e.g., interferons α, β and γ; IL-1, GM-CSF and TNF (Bukowski et al., 1998; Davidson et al., 1998; Hellstrand et al., 1998) gene therapy, e.g., TNF, IL-1, IL-2, p53 (Qin et al., 1998; Austin-Ward and Villaseca, 1998; U.S. Pat. Nos. 5,830,880 and 5,846,945) and monoclonal antibodies, e.g., anti-ganglioside GM2, anti-HER-2, anti-p185 (Pietras et al., 1998; Hanibuchi et al., 1998; U.S. Pat. No. 5,824,311). It is contemplated that one or more anti-cancer antibody therapies may be employed with the gene silencing therapies described herein.

In active immunotherapy, an antigenic peptide, polypeptide or protein, or an autologous or allogenic tumor cell composition or "vaccine" is administered, generally with a distinct bacterial adjuvant (Ravindranath and Morton, 1991; Morton et al., 1992; Mitchell et al., 1990; Mitchell et al., 1993).

In adoptive immunotherapy, the patient's circulating lymphocytes, or tumor infiltrated lymphocytes, are isolated in vitro, activated by lymphokines such as IL-2 or transduced with genes for tumor necrosis, and readministered (Rosenberg et al., 1988; 1989).

In some embodiments, the immunotherapy may be an immune checkpoint inhibitor. Immune checkpoints either turn up a signal (e.g., co-stimulatory molecules) or turn down a signal. Inhibitory immune checkpoints that may be targeted by immune checkpoint blockade include adenosine A2A receptor (A2AR), B7-H3 (also known as CD276), B and T lymphocyte attenuator (BTLA), cytotoxic T-lymphocyte-associated protein 4 (CTLA-4, also known as CD152), indoleamine 2,3-dioxygenase (IDO), killer-cell immunoglobulin (KIR), lymphocyte activation gene-3 (LAG3), programmed death 1 (PD-1), T-cell immunoglobulin domain and mucin domain 3 (TIM-3) and V-domain Ig suppressor of T cell activation (VISTA). In particular, the immune checkpoint inhibitors target the PD-1 axis and/or CTLA-4.

The immune checkpoint inhibitors may be drugs such as small molecules, recombinant forms of ligand or receptors, or, in particular, are antibodies, such as human antibodies (e.g., International Patent Publication WO2015016718; Pardoll, *Nat Rev Cancer*, 12(4): 252-64, 2012; both incorporated herein by reference). Known inhibitors of the immune checkpoint proteins or analogs thereof may be used, in particular chimerized, humanized or human forms of antibodies may be used. As the skilled person will know, alternative and/or equivalent names may be in use for certain antibodies mentioned in the present disclosure. Such alternative and/or equivalent names are interchangeable in the context of the present disclosure. For example, it is known that lambrolizumab is also known under the alternative and equivalent names MK-3475 and pembrolizumab.

In some embodiments, the PD-1 binding antagonist is a molecule that inhibits the binding of PD-1 to its ligand binding partners. In a specific aspect, the PD-1 ligand binding partners are PDL1 and/or PDL2. In another embodiment, a PDL1 binding antagonist is a molecule that inhibits the binding of PDL1 to its binding partners. In a specific aspect, PDL1 binding partners are PD-1 and/or B7-1. In another embodiment, the PDL2 binding antagonist is a molecule that inhibits the binding of PDL2 to its binding partners. In a specific aspect, a PDL2 binding partner is PD-1. The antagonist may be an antibody, an antigen binding fragment thereof, an immunoadhesin, a fusion protein, or oligopeptide. Exemplary antibodies are described in U.S. Pat. Nos. 8,735,553, 8,354,509, and 8,008,449, all incorporated herein by reference. Other PD-1 axis antagonists for use in the methods provided herein are known in the art such as described in U.S. Patent Publication Nos. 20140294898, 2014022021, and 20110008369, all incorporated herein by reference.

In some embodiments, the PD-1 binding antagonist is an anti-PD-1 antibody (e.g., a human antibody, a humanized antibody, or a chimeric antibody). In some embodiments, the anti-PD-1 antibody is selected from the group consisting of nivolumab, pembrolizumab, and CT-011. In some embodiments, the PD-1 binding antagonist is an immunoadhesin (e.g., an immunoadhesin comprising an extracellular or PD-1 binding portion of PDL1 or PDL2 fused to a constant region (e.g., an Fc region of an immunoglobulin sequence). In some embodiments, the PD-1 binding antagonist is AMP-224. Nivolumab, also known as MDX-1106-04, MDX-1106, ONO-4538, BMS-936558, and OPDIVO®, is an anti-PD-1 antibody described in WO2006/121168. Pembrolizumab, also known as MK-3475, Merck 3475, lambrolizumab, KEYTRUDA®, and SCH-900475, is an anti-PD-1 antibody described in WO2009/114335. CT-011, also known as hBAT or hBAT-1, is an anti-PD-1 antibody described in WO2009/101611. AMP-224, also known as B7-DCIg, is a PDL2-Fc fusion soluble receptor described in WO2010/027827 and WO2011/066342.

Another immune checkpoint that can be targeted in the methods provided herein is the cytotoxic T-lymphocyte-associated protein 4 (CTLA-4), also known as CD152. The complete cDNA sequence of human CTLA-4 has the Genbank accession number L15006. CTLA-4 is found on the surface of T cells and acts as an "off" switch when bound to CD80 or CD86 on the surface of antigen-presenting cells. CTLA4 is a member of the immunoglobulin superfamily that is expressed on the surface of Helper T cells and transmits an inhibitory signal to T cells. CTLA4 is similar to the T-cell co-stimulatory protein, CD28, and both molecules bind to CD80 and CD86, also called B7-1 and B7-2 respectively, on antigen-presenting cells. CTLA4 transmits an inhibitory signal to T cells, whereas CD28 transmits a stimulatory signal. Intracellular CTLA4 is also found in regulatory T cells and may be important to their function. T cell activation through the T cell receptor and CD28 leads to increased expression of CTLA-4, an inhibitory receptor for B7 molecules.

In some embodiments, the immune checkpoint inhibitor is an anti-CTLA-4 antibody (e.g., a human antibody, a humanized antibody, or a chimeric antibody), an antigen binding fragment thereof, an immunoadhesin, a fusion protein, or oligopeptide.

Anti-human-CTLA-4 antibodies (or VH and/or VL domains derived therefrom) suitable for use in the present methods can be generated using methods well known in the art. Alternatively, art recognized anti-CTLA-4 antibodies can be used. For example, the anti-CTLA-4 antibodies disclosed in: U.S. Pat. No. 8,119,129, WO 01/14424, WO 98/42752; WO 00/37504 (CP675,206, also known as tremelimumab; formerly ticilimumab), U.S. Pat. No. 6,207,156; Hurwitz et al. (1998) Proc Natl Acad Sci USA 95(17): 10067-10071; Camacho et al. (2004) J Clin Oncology 22(145): Abstract No. 2505 (antibody CP-675206); and Mokyr et al. (1998) Cancer Res 58:5301-5304 can be used in the methods disclosed herein. The teachings of each of the aforementioned publications are hereby incorporated by reference. Antibodies that compete with any of these art-recognized antibodies for binding to CTLA-4 also can be used. For example, a humanized CTLA-4 antibody is described in International Patent Application No. WO2001014424, WO2000037504, and U.S. Pat. No. 8,017,114; all incorporated herein by reference.

An exemplary anti-CTLA-4 antibody is ipilimumab (also known as 10D1, MDX-010, MDX-101, and Yervoy®) or antigen binding fragments and variants thereof (see, e.g., WO 01/14424). In other embodiments, the antibody comprises the heavy and light chain CDRs or VRs of ipilimumab. Accordingly, in one embodiment, the antibody comprises the CDR1, CDR2, and CDR3 domains of the VH region of ipilimumab, and the CDR1, CDR2 and CDR3 domains of the VL region of ipilimumab. In another embodiment, the antibody competes for binding with and/or binds to the same epitope on CTLA-4 as the above-mentioned antibodies. In another embodiment, the antibody has at least about 90% variable region amino acid sequence identity with the above-mentioned antibodies (e.g., at least about 90%, 95%, or 99% variable region identity with ipilimumab).

Other molecules for modulating CTLA-4 include CTLA-4 ligands and receptors such as described in U.S. Pat. Nos. 5,844,905, 5,885,796 and International Patent Application Nos. WO1995001994 and WO1998042752; all incorporated herein by reference, and immunoadhesins such as described in U.S. Pat. No. 8,329,867, incorporated herein by reference.

In some embodiment, the immune therapy could be adoptive immunotherapy, which involves the transfer of autologous antigen-specific T cells generated ex vivo. The T cells used for adoptive immunotherapy can be generated either by expansion of antigen-specific T cells or redirection of T cells through genetic engineering (Park, Rosenberg et al. 2011). Isolation and transfer of tumor specific T cells has been shown to be successful in treating melanoma. Novel specificities in T cells have been successfully generated through the genetic transfer of transgenic T cell receptors or chimeric antigen receptors (CARs) (Jena, Dotti et al. 2010). CARs are synthetic receptors consisting of a targeting moiety that is associated with one or more signaling domains in a single fusion molecule. In general, the binding moiety of a CAR consists of an antigen-binding domain of a single-chain antibody (scFv), comprising the light and variable fragments of a monoclonal antibody joined by a flexible linker. Binding moieties based on receptor or ligand domains have also been used successfully. The signaling domains for first generation CARs are derived from the cytoplasmic region of the CD3zeta or the Fc receptor gamma chains. CARs have successfully allowed T cells to be redirected against antigens expressed at the surface of tumor cells from various malignancies including lymphomas and solid tumors (Jena, Dotti et al. 2010).

In one embodiment, the present application provides for a combination therapy for the treatment of cancer wherein the combination therapy comprises adoptive T-cell therapy and a checkpoint inhibitor. In one aspect, the adoptive T-cell therapy comprises autologous and/or allogenic T cells. In another aspect, the autologous and/or allogenic T cells are targeted against tumor antigens.

D. Surgery

Approximately 60% of persons with cancer will undergo surgery of some type, which includes preventative, diagnostic or staging, curative, and palliative surgery. Curative surgery is a cancer treatment that may be used in conjunction with other therapies, such as the treatment of the present invention, chemotherapy, radiotherapy, hormonal therapy, gene therapy, immunotherapy and/or alternative therapies.

Curative surgery includes resection in which all or part of cancerous tissue is physically removed, excised, and/or destroyed. Tumor resection refers to physical removal of at least part of a tumor. In addition to tumor resection, treatment by surgery includes laser surgery, cryosurgery, electrosurgery, and microscopically controlled surgery (Mohs' surgery). It is further contemplated that the present invention may be used in conjunction with removal of superficial cancers, precancers, or incidental amounts of normal tissue.

Upon excision of part or all of cancerous cells, tissue, or tumor, a cavity may be formed in the body. Treatment may be accomplished by perfusion, direct injection or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

E. Other Agents

It is contemplated that other agents may be used in combination with certain aspects of the present embodiments to improve the therapeutic efficacy of treatment. These additional agents include agents that affect the upregulation of cell surface receptors and GAP junctions, cytostatic and differentiation agents, inhibitors of cell adhesion, agents that increase the sensitivity of the hyperproliferative cells to apoptotic inducers, or other biological agents. Increases in intercellular signaling by elevating the number of GAP junctions would increase the anti-hyperproliferative effects on the neighboring hyperproliferative cell population. In other embodiments, cytostatic or differentiation agents can be used in combination with certain aspects of the present embodiments to improve the anti-hyperproliferative efficacy of the treatments. Inhibitors of cell adhesion are contemplated to improve the efficacy of the present embodiments. Examples of cell adhesion inhibitors are focal adhesion kinase (FAKs) inhibitors and Lovastatin. It is further contemplated that other agents that increase the sensitivity of a hyperproliferative cell to apoptosis, such as the antibody c225, could be used in combination with certain aspects of the present embodiments to improve the treatment efficacy.

VIII. KITS AND DIAGNOSTICS

In various aspects of the invention, a kit is envisioned containing therapeutic agents and/or other therapeutic and delivery agents. In some embodiments, the present invention contemplates a kit for preparing and/or administering a therapy of the invention. The kit may comprise reagents capable of use in administering an active or effective agent(s) of the invention. Reagents of the kit may include at least one inhibitor of gene expression (e.g., a IGF-1R oligonucleotide), one or more lipid component, one or more anti-cancer component of a combination therapy, as well as reagents to prepare, formulate, and/or administer the components of the invention or perform one or more steps of the inventive methods.

In some embodiments, the kit may also comprise a suitable container means, which is a container that will not react with components of the kit, such as an eppendorf tube, an assay plate, a syringe, a bottle, or a tube. The container may be made from sterilizable materials such as plastic or glass.

The kit may further include an instruction sheet that outlines the procedural steps of the methods, and will follow substantially the same procedures as described herein or are known to those of ordinary skill.

IX. EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—IGF-1R-Targeted P-Ethoxy Oligonucleotides

Oligonucleotides targeting IGF-1R were designed for use in a liposomal IGF-1R antisense drug product to inhibit the expression of IGF-1R protein. The contiguous cDNA sequence of IGF-1R is provided in SEQ ID NO: 3 and the protein sequence of IGF-1R is provided in SEQ ID NO: 4. The sequence of each of the oligonucleotides is provided in Table 4.

TABLE 4

IGF-1R antisense sequences

| Antisense name | Sequence | SEQ ID NO: |
|---|---|---|
| IGF-1R_AS1 | 5'-TCC TCC GGA GCC AGA CTT-3' | 1 |
| IGF-1R_AS2 | 5'-GGA CCC TCC TCC GGA GCC-3' | 2 |

The liposomal IGF-1R antisense drug product was manufactured according to the methods described herein. Mass spectrometry testing for the IGF-1R_AS1 base oligonucleotide showed that over 80% of the oligonucleotide drug substance had between three and seven phosphodiester backbone linkages and that over 70% of the oligonucleotide drug substance had between 4 and seven phosphodiester backbone linkages.

Example 2—Effects of Liposomal IGF-1R Antisense on GL261 Tumor Growth in Mice

The ability of liposomal IGF-1R_AS1 antisense to prevent growth of GL261 cell tumors implanted in mice was tested. GL261 cells (105) were implanted in the flanks of C57BL/6 mice on day 0. Fourteen days later, liposomal IGF-1R_AS1 antisense (0.75 mg, 0.25 mg, or 0.075 mg) was administered intraperitoneally. Mice were followed to track tumor development. Administration of liposomal IGF-1R_AS1 antisense delayed formation of tumors (FIG. 1).

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

1. U.S. Pat. No. 4,659,774
2. U.S. Pat. No. 4,816,571
3. U.S. Pat. No. 4,870,287
4. U.S. Pat. No. 4,959,463
5. U.S. Pat. No. 5,141,813
6. U.S. Pat. No. 5,214,136
7. U.S. Pat. No. 5,223,618
8. U.S. Pat. No. 5,264,566
9. U.S. Pat. No. 5,378,825
10. U.S. Pat. No. 5,428,148
11. U.S. Pat. No. 5,446,137
12. U.S. Pat. No. 5,466,786
13. U.S. Pat. No. 5,470,967
14. U.S. Pat. No. 5,539,082
15. U.S. Pat. No. 5,554,744
16. U.S. Pat. No. 5,574,146
17. U.S. Pat. No. 5,602,240
18. U.S. Pat. No. 5,602,244
19. U.S. Pat. No. 5,610,289
20. U.S. Pat. No. 5,614,617
21. U.S. Pat. No. 5,623,070
22. U.S. Pat. No. 5,652,099
23. U.S. Pat. No. 5,670,663
24. U.S. Pat. No. 5,672,697
25. U.S. Pat. No. 5,681,947
26. U.S. Pat. No. 5,700,922
27. U.S. Pat. No. 5,705,629
28. U.S. Pat. No. 5,708,154
29. U.S. Pat. No. 5,714,331
30. U.S. Pat. No. 5,714,606
31. U.S. Pat. No. 5,719,262
32. U.S. Pat. No. 5,736,336
33. U.S. Pat. No. 5,739,169
34. U.S. Pat. No. 5,760,395
35. U.S. Pat. No. 5,763,167
36. U.S. Pat. No. 5,766,855
37. U.S. Pat. No. 5,773,571
38. U.S. Pat. No. 5,777,092
39. U.S. Pat. No. 5,786,461
40. U.S. Pat. No. 5,792,847
41. U.S. Pat. No. 5,801,005
42. U.S. Pat. No. 5,824,311
43. U.S. Pat. No. 5,830,880
44. U.S. Pat. No. 5,846,945
45. U.S. Pat. No. 5,855,911
46. U.S. Pat. No. 5,858,988
47. U.S. Pat. No. 5,859,221
48. U.S. Pat. No. 5,872,232
49. U.S. Pat. No. 5,886,165
50. U.S. Pat. No. 5,891,625
51. U.S. Pat. No. 5,908,845
52. U.S. Pat. No. 6,541,036
53. U.S. Pat. No. 9,744,187
54. Amin et al., Oncogene, 22:5399-5407, 2013.
55. Arteaga et al., Cancer Res., 49:6237-41, 1989.
56. Austin-Ward and Villaseca, Revista Medica de Chile, 126(7):838-845, 1998.
57. Bailey and Sullivan, Biochimica. Biophys. Acts., 239-252, 2000.
58. Bangham et al., J. Mol. Biol, 13(1):253-259, 1965.
59. Bukowski et al., Clinical Cancer Res., 4(10):2337-2347, 1998.
60. Christodoulides et al., Microbiology, 144(Pt 11):3027-3037, 1998.
61. Davidson et al., J. Immunother., 21(5):389-398, 1998.
62. Deamer and Uster, In: Liposome Preparation: Methods and Mechanisms, Ostro (Ed.), Liposomes, 1983.
63. Dokka et al., Pharm Res, 17: 521-25, 2000.
64. duBois et al., J Clin Oncol, 17: 46-51, 1999.
65. Dubey et al, J. Drug Target, 12:257-264, 2004.
66. Duxbury et al., Biochem. Biophys. Res. Commun., 311:786-792, 2003.
67. Duxbury et al., Oncogene, 23:1448-1456, 2004.
68. Egholm et al., Nature, 365(6446):566-568, 1993.
69. Elbashir et al., Nature, 411 (6836):494-498, 2001.
70. European Appln. 01219
71. European Appln. 266,032
72. Fagard et al., JAKSTAT, 2:e22882, 2013.
73. Farhood et al., Biochim. Biophys. Act, 289-295, 1995.
74. Fire et al., Nature, 391(6669):806-811, 1998.
75. Flenniken et al., Dev. Biol., 179:382-401, 1996.
76. Froehler et al., Nucleic Acids Res., 14(13):5399-5407, 1986.
77. Gabizon, Cancer Invest., 19:424-436, 2001.
78. Ghosh and Bachhawat, In: Liver Diseases, Targeted Diagnosis and Therapy Using Specific Receptors and Ligands, Wu et al. (Eds.), Marcel Dekker, NY, 87-104, 1991.
79. Gregoriadis, In: Drug Carriers in Biology and Medicine, Gregoriadis (Ed.), 287-341, 1979.
80. Gutierrez-Puente et al., J. Pharmacol. Exp. Ther., 291: 865-869, 1999.
81. Halder et al., Clinical Cancer Research, 11: 8829-36, 2005.
82. Han et al., Ann Surg Oncol, 4:264-268, 1997.
83. Hanibuchi et al., Int. J. Cancer, 78(4):480-485, 1998.
84. Hannon and Rossi, Nature, 431:371-378, 2004.
85. Hardee et al., G3 (Bethesda) 3:2173-2185, 2013.
86. Hassani et al., J. Gene Med., 7(2):198-207, 2005.
87. Hecker et al., Cancer Research, 62:2699-2707, 2002.
88. Hellstrand et al., Acta Oncologica, 37(4):347-353, 1998.
89. Hortobagyi et al., J. Clin. Oncol., 19:3422-3433, 2001.
90. Hsia et al., J Cell Biol, 160:753-67, 2003.
91. Hui and Hashimoto, Infection Immun., 66(11):5329-5336, 1998.
92. Jackson et al., Nat. Biotechnol., 21:635-637, 2003.
93. Jemal et al, CA Cancer J. Clin., 55(1):10-30, 2005.
94. Jiang et al., Oncogene, 18:6071-77, 1999.
95. Judson et al., Cancer, 86: 1551-56, 1999.
96. Kaneda et al., Science, 243:375-378, 1989.
97. Kato et al., J. Biol. Chem., 266:3361-3364, 1991.

98. Kim et al., Nat. Biotechnol., 22:321-325, 2004.
99. Kinch et al., Clin. Exp. Metastasis, 20:59-68, 2003.
100. Klein et al., Gastroenterology, 125:9-18, 2003.
101. Kohno et al., Int J Cancer, 97:336-43, 2002.
102. Kornberg and Baker, DNA Replication, 2nd Ed., Freeman, San Francisco, 1992.
103. Kornberg et al., Invest Opthalmol Vis Sci, 45:4463-69, 2004.
104. Kornberg, Head Neck, 20: 634-639, 1998.
105. Kostarelos et al., Int J Cancer, 112: 713-21, 2004.
106. Krasnici et al., Int. J. Cancer, 105(4):561-567, 2003.
107. Landen, Cancer Res, 65: 6910-18, 2005.
108. Langley et al., Cancer Research, 63: 2971-76, 2003.
109. Lewis et al., Cell, 115:787-798, 2003.
110. Lewis et al., Nat. Genet., 32:107-108, 2002.
111. Li et al., Biochem. Biophys. Res. Com., 196:92-98, 1993.
112. Lori et al., Am. J. Pharmacogenomics, 2:245-252, 2002.
113. Matsuda et al., Proc. Natl. Acad. Sci. USA, 101:16-22, 2004.
114. McCaffrey et al., Nature, 418:38-39, 2002.
115. McGuire et al., New England Journal of Medicine, 334:1-6, 1996.
116. McLean et al., Expert Opin Pharmacother, 4: 227-34, 2003.
117. Miklossy et al., Nat. Rev. Drug Discov., 12:611-629, 2013.
118. Miller et al., Biochemistry, 37(37):12875-83, 1998.
119. Mitchell et al., Ann. NY Acad. Sci., 690:153-166, 1993.
120. Mitchell et al., J. Clin. Oncol., 8(5):856-869, 1990.
121. Mitra et al., Nature Reviews Molecular Cell Biology, 6: 56-68, 2005.
122. Mitra et al., Proc Am Assoc Cancer Res, 2005.
123. Morton et al., Arch. Surg., 127:392-399, 1992.
124. Nemoto et al., Pathobiology, 65:195-203, 1997.
125. Nicolau et al., Methods Enzymol., 149:157-176, 1987.
126. Noblitt et al., Cancer Gene Ther., 11:757-766, 2004.
127. Ogawa et al, Oncogene, 19:6043-6052, 2000.
128. Owens et al., Cancer Res, 55:2752-2755, 1995.
129. Park et al., Cancer Lett., 118:153-160, 1997.
130. PCT Publn. WO 92/20702
131. PCT Publn. WO 02/100435
132. PCT Publn. WO 03/015757
133. PCT Publn. WO 04/002453
134. PCT Publn. WO 04/029213
135. PCT Publn. WO 2016/164916
136. Pietras et al., Oncogene, 17(17):2235-2249, 1998.
137. Qin et al., Proc. Natl. Acad. Sci. USA, 95(24):14411-14416, 1998.
138. Ravindranath and Morton, Intern. Rev. Immunol., 7: 303-329, 1991.
139. Reich et al., Mol. Vis., 9:210-216, 2003.
140. Remington's Pharmaceutical Sciences, 18th Ed. Mack Printing Company, 1289-1329, 1990.
141. Rosenberg et al., Ann. Surg. 210(4):474-548, 1989.
142. Rosenberg et al., N. Engl. J. Med., 319:1676, 1988.
143. Ryther et al., Gene Ther., 12(1):5-11, 2004.
144. Sambrook et al., In: Molecular cloning, Cold Spring Harbor Laboratory Press, Cold Spring Harbor, N.Y., 2001.
145. Schaller and Parsons, Trends in Cell Biology, 3:258-62, 1993.
146. Schaller et al., Mol Biol Cell, 10:3489-3505, 1999.
147. Schaller, Biochim Biophys Acta, 1540:1-21, 2001.
148. Schaller, J Endocrinol, 150:1-7, 1996.
149. Schaller, Trends Cell Biol, 3:258-262, 1993.
150. Scheit, In: Synthesis and Biological Function, Wiley-Interscience, NY, 171-172, 1980.
151. Schlaepfer and Hunter, Trends in Cell Biology, 8: 151-57, 1998.
152. Schlaepfer et al., Prog Biophys Mol Biol, 71: 435-78, 1999.
153. Scotlandi et al., Cancer Res., 58:4127-31, 1998.
154. Scuto et al., Cancer Res., 71:3182-3188, 2011.
155. Sein et al., Oncogene, 19: 5539-42, 2000.
156. Sheta et al., J Natl Cancer inst, 92: 1065-73, 2000.
157. Shibata et al., Cancer Res, 58: 900-903, 1998.
158. Sieg et al., Nat Cell Biol, 2:249-56, 2000.
159. Sioud and Sorensen, Biochem. Biophys. Res. Comm., 312:1220-1225, 2003.
160. Siwak et al., Clin Cancer Res, 8: 955-56, 2002.
161. Sledz et al., Nat. Cell Biol., 5:834-839, 2003.
162. Song et al., Nature Med. 9:347-351, 2003.
163. Sonoda et al., Journal of Biological Chemistry, 275: 16309-15, 2000.
164. Sood et al., Am J Pathol, 165:1087-1095, 2004.
165. Sood et al., Cancer Biology & Therapy, 1: 511-17, 2002.
166. Sorensen et al., J. Mol. Biol., 327:761-66, 2003.
167. Soutschek et al., Nature, 432:173-178, 2004.
168. Spagnou et al., Biochemistry, 43:13348-13356, 2004.
169. Sulman et al., Genomics, 40:371-374, 1997.
170. Szoka and Papahadjopoulos, Proc. Natl. Acad. Sci. USA, 75:4194-4198, 1978.
171. Thaker et al., 36th Annual Meeting of the Society of Gynecologic Oncologists, Miami, Fla., 2005.
172. Thaker et al., Clin. Cancer Res., 10:5145-5150, 2004.
173. Thurston et al., J. Clin. Invest., 101(7):1401-1413, 1998.
174. Uchida et al., Mol. Ther., 10:162-171, 2004.
175. Voskoglou-Nomikos et al., Clin. Cancer Res., 9:4227-4239, 2003.
176. Walker-Daniels et al., Prostate, 41:275-80, 1999.
177. Wianny et al., Nat. Cell Biol., 2:70-75, 2000.
178. Wong et al., Gene, 10:87-94, 1980.
179. Wu et al., J. Hematol. Oncol., 4:31, 2011.
180. Xia et al., Nat. Biotechnol, 20:1006-10, 2002.
181. Yang et al., Oncogene, 22:5694-701, 2003.
182. Zelinski et al., Cancer Res., 61:2301, 2001.
183. Zhang et al., J. Biol. Chem., 279:10677-684, 2004.
184. Zia et al., J. Cell. Biol., 24:269-75, 1996.

What is claimed is:

1. A method of treating a subject with a cancer or an autoimmune disease comprising administering to the subject a therapeutically effective amount of the pharmaceutical composition comprising a population of oligonucleotides, wherein the oligonucleotides hybridize to an IGF-1R polynucleotide gene product, wherein oligonucleotides of the population are composed of nucleoside molecules linked together through phosphate backbone linkages, wherein 60% to 75% of the phosphate backbone linkages in each oligonucleotide are P-ethoxy backbone linkages, and wherein 25% to 40% of the phosphate backbone linkages are phosphodiester backbone linkages, phospholipids, wherein the phospholipids are essentially free of cholesterol; and a pharmaceutically acceptable carrier, wherein the oligonucleotides and phospholipids form an oligonucleotide-lipid complex, wherein oligonucleotides of the population comprise a sequence according to SEQ ID NO: 1, wherein administration of the composition reduces expression of IGF-1R protein in the patient; and wherein the phosphate backbone linkages at least between nucleotides 5 and 6, between nucleotides 11 and 12, and between nucleotides 16 and 17 of the oligonucleotides of the population are phosphodiester backbone linkages.

2. The method according to claim 1, wherein the autoimmune disease is a Th2 dominant autoimmune disease, and wherein the Th2 dominant autoimmune disease is lupus, allergic dermatitis, scleroderma, atopic eczema, sinusitis, inflammatory bowel disease, asthma, ulcerative colitis, or multiple chemical sensitivity.

3. A method for reducing the expression level of IGF-1R protein in a cell, comprising contacting the cell with a therapeutically effective amount of a pharmaceutical composition comprising a composition comprising a population of oligonucleotides, wherein the oligonucleotides hybridize to an IGF-1R polynucleotide gene product, wherein oligonucleotides of the population are composed of nucleoside molecules linked together through phosphate backbone linkages, wherein 60% to 75% of the phosphate backbone linkages in each oligonucleotide are P-ethoxy backbone linkages, and wherein 25% to 40% of the phosphate backbone linkages are phosphodiester backbone linkages, wherein the phosphate backbone linkages at least between nucleotides 5 and 6, between nucleotides 11 and 12, and between nucleotides 16 and 17 of the oligonucleotides of the population are phosphodiester backbone linkages, phospholipids, and a pharmaceutically acceptable carrier, wherein the oligonucleotides and phospholipids form an oligonucleotide-lipid complex, wherein the phospholipids are essentially free of cholesterol.

4. A method for delivering a therapeutically effective amount of an oligonucleotide to a cell comprising contacting the cell with a therapeutically effective amount of a pharmaceutical composition comprising a composition comprising a population of oligonucleotides, wherein the oligonucleotides hybridize to an IGF-1R polynucleotide gene product, wherein oligonucleotides of the population are composed of nucleoside molecules linked together through phosphate backbone linkages, wherein 60% to 75% of the phosphate backbone linkages in each oligonucleotide are P-ethoxy backbone linkages, and wherein 25% to 40% of the phosphate backbone linkages are phosphodiester backbone linkages, wherein the phosphate backbone linkages at least between nucleotides 5 and 6, between nucleotides 11 and 12, and between nucleotides 16 and 17 of the oligonucleotides of the population are phosphodiester backbone linkages, phospholipids, and a pharmaceutically acceptable carrier, wherein the oligonucleotides and phospholipids form an oligonucleotide-lipid complex, wherein the phospholipids are essentially free of cholesterol.

* * * * *